(12) United States Patent
Okuno et al.

(10) Patent No.: US 11,635,922 B2
(45) Date of Patent: Apr. 25, 2023

(54) IMAGE RECORDING DEVICE

(71) Applicant: BROTHER KOGYO KABUSHIKI KAISHA, Nagoya (JP)

(72) Inventors: Tetsuya Okuno, Nagoya (JP); Shinya Esaki, Nagoya (JP); Shunsuke Minamikawa, Nagoya (JP); Haruka Azechi, Nagoya (JP); Yushi Deura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 22 days.

(21) Appl. No.: 17/485,866

(22) Filed: Sep. 27, 2021

(65) Prior Publication Data

US 2022/0011985 A1   Jan. 13, 2022

Related U.S. Application Data

(63) Continuation of application No. PCT/JP2020/013607, filed on Mar. 26, 2020.

(30) Foreign Application Priority Data

Mar. 28, 2019 (JP) .............................. JP2019-063836

(51) Int. Cl.
*G06F 3/12* (2006.01)

(52) U.S. Cl.
CPC ............ *G06F 3/1204* (2013.01); *G06F 3/121* (2013.01); *G06F 3/1206* (2013.01);
(Continued)

(58) Field of Classification Search
None
See application file for complete search history.

(56) References Cited

U.S. PATENT DOCUMENTS

| 5,800,081 A | 9/1998 | Teradaira |
| 2005/0183010 A1* | 8/2005 | Iwasaki ................. G06F 3/1285 715/249 |

(Continued)

FOREIGN PATENT DOCUMENTS

| JP | H07-137358 A | 5/1995 |
| JP | 2006-091985 A | 4/2006 |
| JP | 2013-025548 A | 2/2013 |

OTHER PUBLICATIONS

International Search Report dated Jun. 23, 2020 received in PCT/JP2020/013607.

(Continued)

*Primary Examiner* — Lennin R Rodriguezgonzalez
(74) *Attorney, Agent, or Firm* — Scully, Scott, Murphy & Presser, PC

(57) ABSTRACT

A controller of an image reading device is configured to obtain template data from an information processing device through a communication interface. The template data includes format data, first replacement data, and second replacement data. The controller replaces the first replacement data with identification data of the image recording device, replaces the second replacement data with detailed information, and generates transmission data containing the format data, the identification data, and the detailed information. The controller transmits the generated transmission data to the information processing device through the communication interface.

7 Claims, 12 Drawing Sheets

(52) U.S. Cl.
CPC .......... *G06F 3/1235* (2013.01); *G06F 3/1287* (2013.01); *G06F 3/1293* (2013.01)

(56) References Cited

U.S. PATENT DOCUMENTS

| | | |
|---|---|---|
| 2006/0136424 A1 | 6/2006 | Nuggehalli et al. |
| 2009/0021780 A1* | 1/2009 | Sato .................. H04N 1/00347 |
| | | 358/1.15 |
| 2013/0021621 A1 | 1/2013 | Sato |

OTHER PUBLICATIONS

International Preliminary Report on Patentability together with the Written Opinion dated Sep. 28, 2021 from related PCT/JP2020/013607.

* cited by examiner

FIG. 4A

TEMPLATE DATA 1 (FIRST SERVICE PROVIDER)

```
<DEVICE INFORMATION>
<SERIAL NUMBER>%serial_number%</SERIAL NUMBER>
<FIRM VERSION>%firm_version%</FIRM VERSION>
<ACCUMULATED PRINTED PAGES>%print_page%</ACCUMULATED PRINTED PAGES>
<WASTE INK AMOUNT>%waste_ink%</WASTE INK AMOUNT>
<INK REMAINING AMOUNT>%remaining_amount%</INK REMAINING AMOUNT>
          ⋮
```

FIG. 4B

TEMPLATE DATA 1 (SECOND SERVICE PROVIDER)

```
{
    "serial_number" : "%serial_number%"
    "program_ver" : "%firm_versin%"
    "page_counter" : "%print_page%"
    "waste_ink" : "%waste_ink%"
    "ink_remaining" : "%remaining_amount%"
          ⋮
```

FIG. 4C

COMPLETION DATA 1

```
<DEVICE INFORMATION>
<SERIAL NUMBER>12345678</SERIAL NUMBER>
<FIRM VERSION>A001</FIRM VERSION>
<ACCUMULATED PRINTED PAGES>130</ACCUMULATED PRINTED PAGES>
<WASTE INK AMOUNT>10</WASTE INK AMOUNT>
<INK REMAINING AMOUNT>4,5,6,7</INK REMAINING AMOUNT>

TEMPLATE DATA 2 (FIRST SERVICE PROVIDER)

```
<DEVICE INFORMATION>
<SERIAL NUMBER>%serial_number%</SERIAL NUMBER>
<EVENT>%event_content%</EVENT>
<INK COLOR>%ink_color%</INK COLOR>
<CARTRIDGE MODEL>%cartridge_modelnumber%</CARTRIDGE MODEL>
          ⋮
```

FIG. 5A

TEMPLATE DATA 3 (FIRST SERVICE PROVIDER)
```
<DEVICE INFORMATION>
<SERIAL NUMBER>%serial_number%</SERIAL NUMBER>
<EVENT>%event_content%</EVENT>
<INK COLOR>%ink_color%</INK COLOR>
<CARTRIDGE MODEL>%cartridge_modelnumber%</CARTRIDGE MODEL>
    ⋮
```

FIG. 5B

TEMPLATE DATA 4 (FIRST SERVICE PROVIDER)
```
<DEVICE INFORMATION>
<SERIAL NUMBER>%serial_number%</SERIAL NUMBER>
<EVENT>%event_content%</EVENT>
<INK COLOR>%ink_color%</INK COLOR>
<CARTRIDGE MODEL>%cartridge_modelnumber%</CARTRIDGE MODEL>
    ⋮
```

FIG. 5C

TEMPLATE DATA 5 (FIRST SERVICE PROVIDER)
```
<DEVICE INFORMATION>
<SERIAL NUMBER>%serial_number%</SERIAL NUMBER>
<EVENT>%event_content%</EVENT>
<FAILURE TYPE>%failure_type%</FAILURE TYPE>
    ⋮
```

FIG. 5D

TEMPLATE DATA 6 (FIRST SERVICE PROVIDER)
```
<DEVICE INFORMATION>
<SERIAL NUMBER>%serial_number%</SERIAL NUMBER>
<EVENT>%event_content%</EVENT>
<FAILURE TYPE>%failure_type%</FAILURE TYPE>
    ⋮
```

FIG. 11

| USER NAME | ADDRESS | SERIAL NUMBER | MODEL NAME | REMAINING INK AMOUNT | WASTE INK AMOUNT | NUMBER OF PRINTED PAGES | EVENT | ... |
|---|---|---|---|---|---|---|---|---|
| ABCDE | 001 | 12345678 | KLMN | 4, 5, 6, 7 | 10 | 130 | INK LOW | |
| | 002 | 23456789 | PQRS | 5 | 3 | 80 | INK EMPTY | |
| | 003 | 34567890 | KLMN | 5, 6, 7, 8 | 15 | 430 | FAILURE | |
| | ⋮ | | | ⋮ | | | | |
| FGHIJ | 001 | 98765432 | PQRS | 6 | 3 | 321 | — | |
| | 002 | 87654321 | PQRS | 5 | 4 | 412 | — | |
| | | 76543210 | PQRS | 7 | 3 | 296 | — | |
| | | | | ⋮ | | | | |

IMAGE RECORDING DEVICE

CROSS-REFERENCE TO RELATED APPLICATIONS

This is a Continuation Application of International Application No. PCT/JP2020/013607 filed on Mar. 26, 2020, which claims priority from Japanese Patent Application No. 2019-063836 filed on Mar. 28, 2019. The entire disclosures of the prior applications are incorporated herein by reference.

BACKGROUND

Technical Field

The present disclosure relates to an image recording device configured to transmit information to an information processing device.

Related Art

There is known a system in which a user of an image recording device enters into a contract with a service provider, and the image recording device notifies a service provider's server of device information such as information related to consumables. The image recording device employed in such a system is typically configured to transmit device information in a data format that the server can analyze.

SUMMARY

The image recording device as mentioned above generally converts the device information into a data format designated by the user upon receiving the user's input operation, and transmits information related to consumables or the like to the server in the converted data format.

According to such a conventional technique, the user's input operation is necessary to convert the data format. Further, if a wrong data format is designated by mistake, the server cannot obtain the information related to the consumables or the like.

According to aspects of the present disclosures, there is provided an image recording device comprising a cartridge configured to hold a cartridge detachably, a print engine configured to perform printing, a communication interface, memory, and a controller. The controller is configured to transmit a reply request to a destination address of an information processing device through the communication interface. The reply request requests the information processing device to transmit template data to the image recording device in reply to the reply request. The template data includes format data, first replacement data, and second replacement data. The controller is further configured to store the template data obtained through the communication interface in the memory, replace the first replacement data of the template data stored in the memory with identification data of the image recording device stored in the memory, replace the second replacement of the template data stored in the memory with detailed information stored in the memory, generate transmission data containing the format data, the identification data, and the detailed information, and transmit the generated transmission data to the destination address of the information processing device through the communication interface.

BRIEF DESCRIPTION OF THE DRAWINGS

FIGS. 4A-4D and FIGS. 5A-5D show template data and completion data.

FIG. 11 schematically shows a configuration of a database.

DETAILED DESCRIPTION

Hereinafter, referring to the accompanying drawings, an embodiment according to the present disclosures will be described. It should be noted that the embodiment described below is only an example, and the embodiment can be modified in various ways without departing form aspects of the present disclosures.

Figure 1:
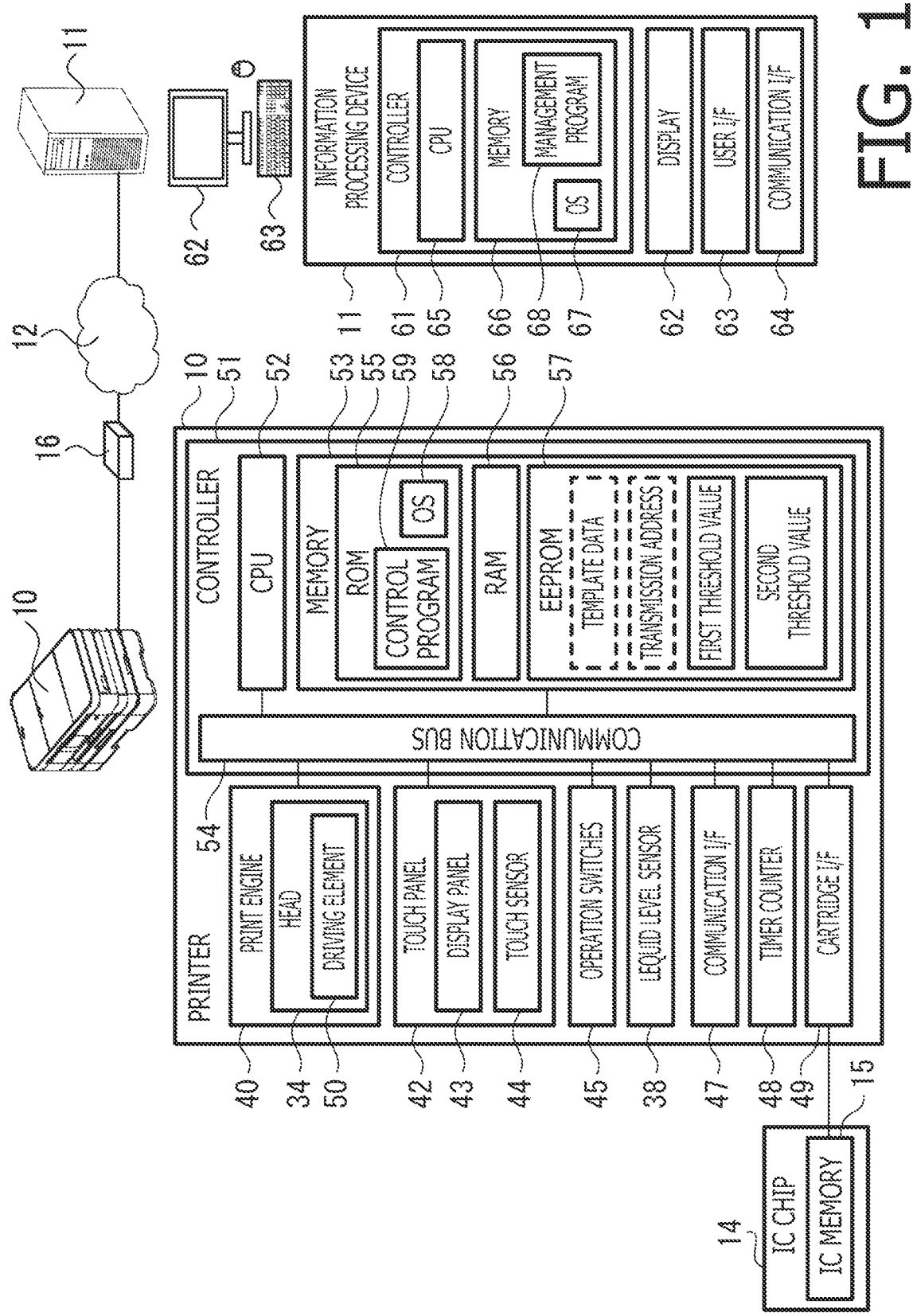
FIG. 1 is a functional block diagram of a printer and an information processing device.

A printer 10 shown in FIG. 1 has a function of transmitting various information to an information processing device 11 through the Internet 12. Examples of the information processing device 11 is a server or the like owned by or authorized for use by a service provider. The service provider is a person or a party who provides services related to usage of the printer 10 to a user of the printer 10. The service provider monitors, for example, a remaining amount of toner or ink stored in a cartridge 13 based on information sent from the printer 10 to the information processing device 11. Then, when the remaining amount of the toner or ink becomes low (e.g., equal to or less than a particular amount), the service provider ships a new cartridge 13 to the user. Thus, the user can obtain the new cartridge 13 before the toner or the ink is totally consumed. It is noted that the printer 10 is an example of an image recording device.

The information processing device 11 is, for example, a server of which URL is laid open on the Internet 12. The information processing device 11 is equipped with a controller 61, a display 62, a user I/F 63, and a communication I/F 64. The term "I/F" stands for an interface. The user I/F 63 includes a mouse, a keyboard, and the like.

The controller 61 mainly includes a CPU 65, which is a central processing unit, memory 66, and a communication bus. The CPU 65, the memory 66, the display 62, the user I/F 63 and the communication I/F 64 are connected to the communication bus. In other words, the CPU 65 is connected to the memory 66, the display 62, the user I/F 63, and the communication I/F 64 through the communication bus so that information and data can be exchanged.

The memory 66 includes a ROM, a RAM, and a hard disk. According to the present embodiment, the hard disk is configured to store an operating system, OS 67, and a management program 68. That is, commands described (stored) in the OS 67 and the management program 68 are executed by the CPU 65. In short, the OS 67 and the management program 68 are executed by the CPU 65. The OS 67 and the management program 68 executed by the CPU 65 display images on the display 62, receive user input through the user I/F 63, transmit and receive information and data through the communication I/F 64, and store the received information and data in the memory 66.

The management program 68 is a program that is configured to manage a database in which various pieces of device information stored in the memory 66 are associated. The management program 68 uses the database to manage a plurality of printers 10. Concretely, the management program 68 performs a registration process to register the various device information transmitted by the printers 10 in the database. As shown in FIG. 11, the database has a plurality of fields of which names (i.e., field names) are "user name," "address," "serial number," "model name," "remaining ink amount," "waste ink amount," "number of printed pages," "event," and the like, and one or more records. One record indicates device information of one printer 10. In the example shown in FIG. 11, the device information in a record identified by "ABODE" associated with the field "User Name" and "12345678" associated with the field "Serial Number" indicates that the "Model Name" is "KLMN," the "Remaining Ink Amount" is "4, 5, 6, 7," and the "Waste Ink Amount" is "10," the number of printed pages" is "130," and the "Event" indicates the "ink low" status. The printer 10 is configured to transmit the field names and the device information in an associated manner Then, the management program 68 identifies, in the database, a record having the device information "KLMN" that matches the device information "KLMN" associated with the "serial number" included in the information transmitted by the printer 10. The management program 68 registers other device information contained in the information transmitted by the printer 10 in each field of the identified record. The details are described below. It is noted that the fields "user name" and "address" are not device information transmitted by the printer 10, but information that has been registered in the database by the service provider or an administrator of the management program 68 in association with the serial number.

The management program 68 is a program written in the XML (Extensible Markup Language) format, the JSON (JavaScript Object Notation) format, or the CSV (comma-separated values) format. For example, one service provider uses a management program 68 written in the XML format, another service provider uses a management program 68 written in the JSON format, and yet another service provider uses a management program 68 written in the CSV format. The management program 68 written in the XML format requests the field names and the device information written in XML format to the printer 10. The management program 68 written in the JSON format requests the field names and the device information written in the JSON format to the printer 10. The management program 68 written in the CSV format requests the field names and the device information written in CSV format to the printer 10. In other words, the printer 10 is requested to provide the field names and the device information in various data formats according to the description language of the management program 68.

In order to enable the printer 10 to transmit the field names and the device information to the information processing device 11 in a data format corresponding to the description language of the management program 68, the vendor of the printer 10 provides the template data and the like, as shown in FIGS. 4 and 5 to the developer of the management program 68. The template data and the like include the template data itself, basic data for generating the template data, and a program for generating the template data. Alternatively, the vendor of the printer 10 may provide the developer of the management program 68 with an SDK (Software Development Kit) that receives the field names from a UI (User Interface) module. The SDK receives the field names from the UI module using, for example, an API (abbreviation for Application Programming Interface), and generates template data using the received field names The SDK then transmits the generated template data to the printer 10 via the Internet 12, and receives completion data (described later) from the printer 10 via the Internet 12. The SDK then registers the device information contained in the received completion data with the database described above. The developer described above develops the management program 68 by developing the UI module that passes field names and the like to the SDK.

The printer 10 may be a printer with dedicated specifications that is used in a mode in which the user concludes a contract with the service provider, or it may be a printer that is used regardless of whether there is a contract between the user and the service provider. In the following, the mode in which the user uses the printer after concluding a contract with the service provider is described as a contract usage mode, and the mode in which the user uses the printer without concluding a contract with the service provider is described as a normal usage mode.

Figure 2A:
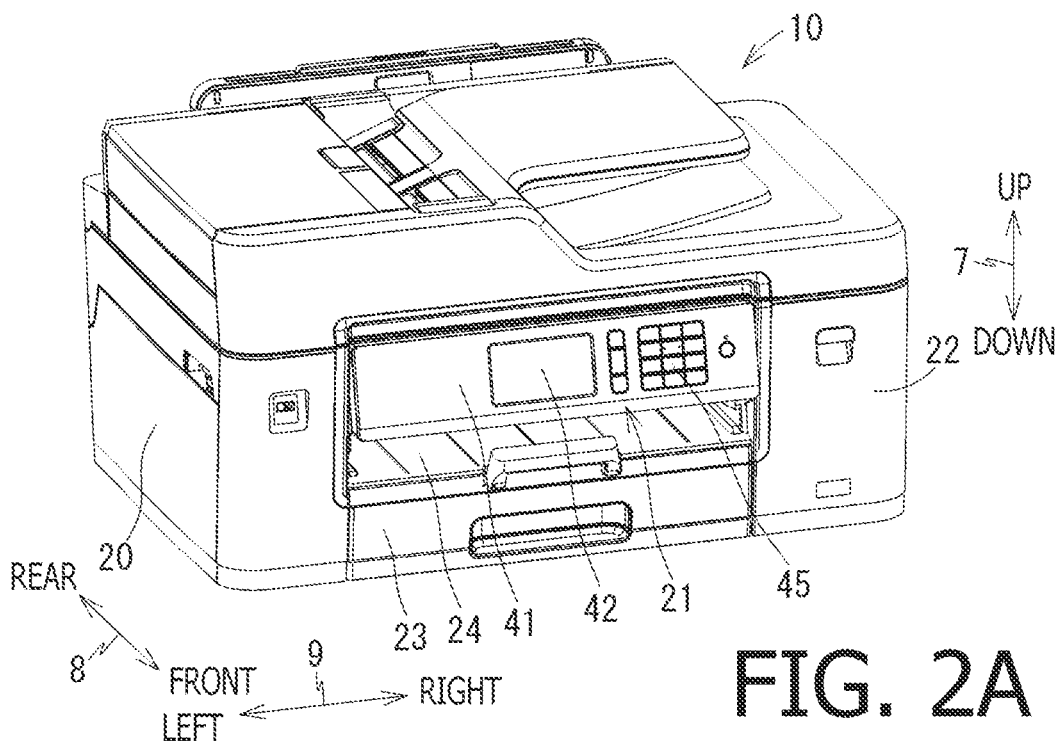
FIG. 2A is a perspective view of the printer with its cover closed.
Figure 2B:
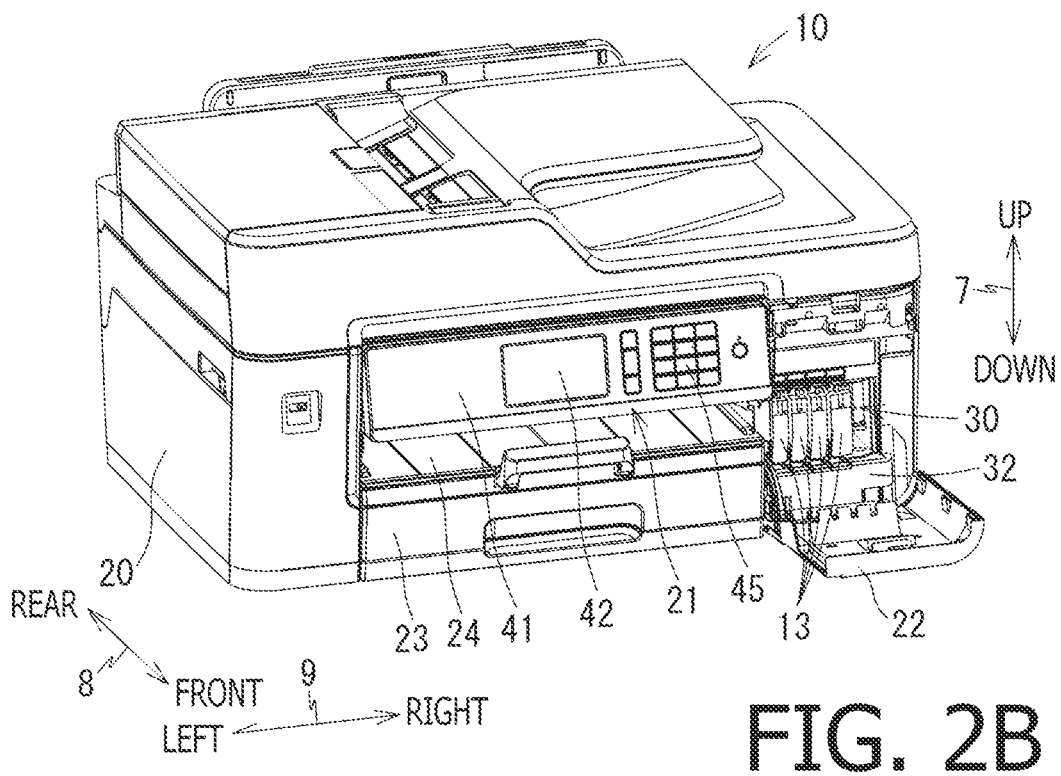
FIG. 2B is a perspective view of the printer with the cover opened.
Figure 3:
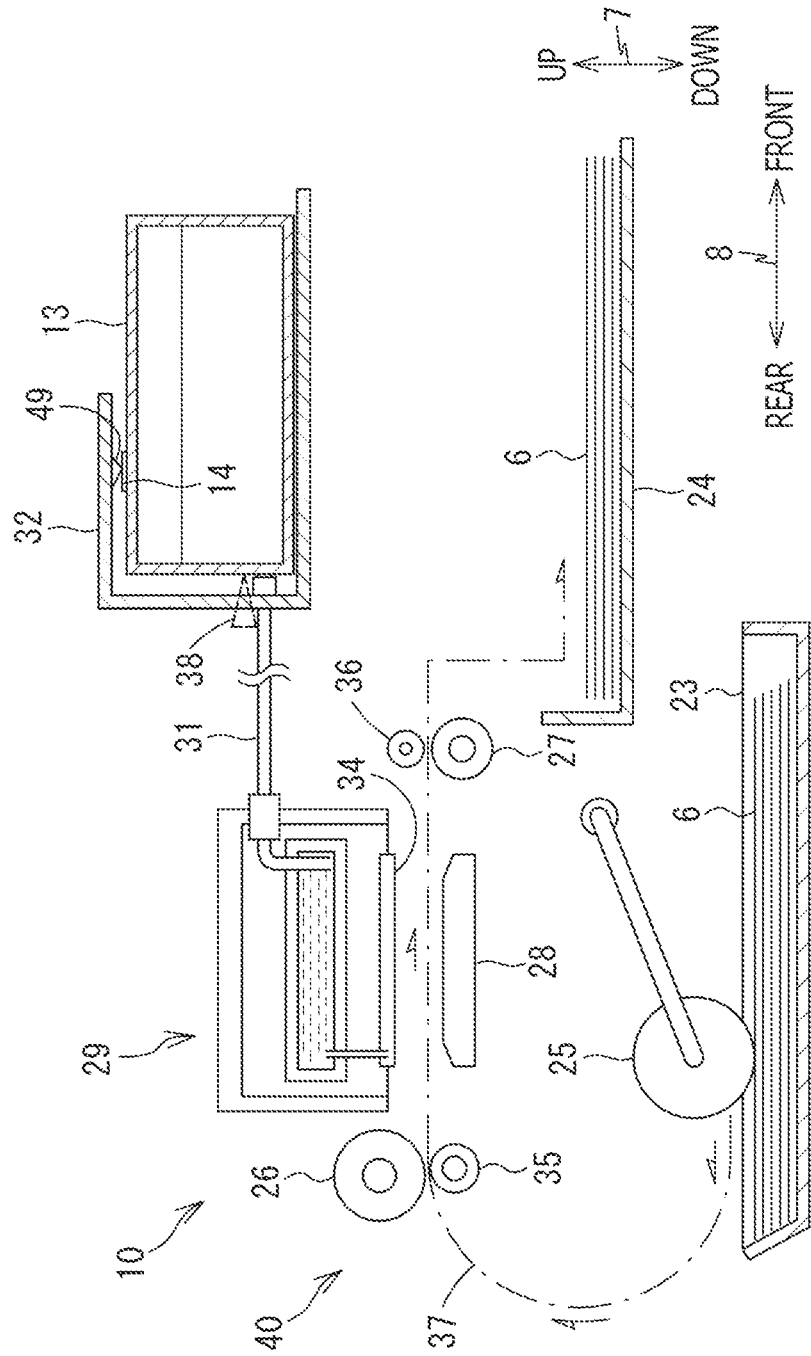
FIG. 3 is a schematic cross-sectional view of the printer.
Figure 6:
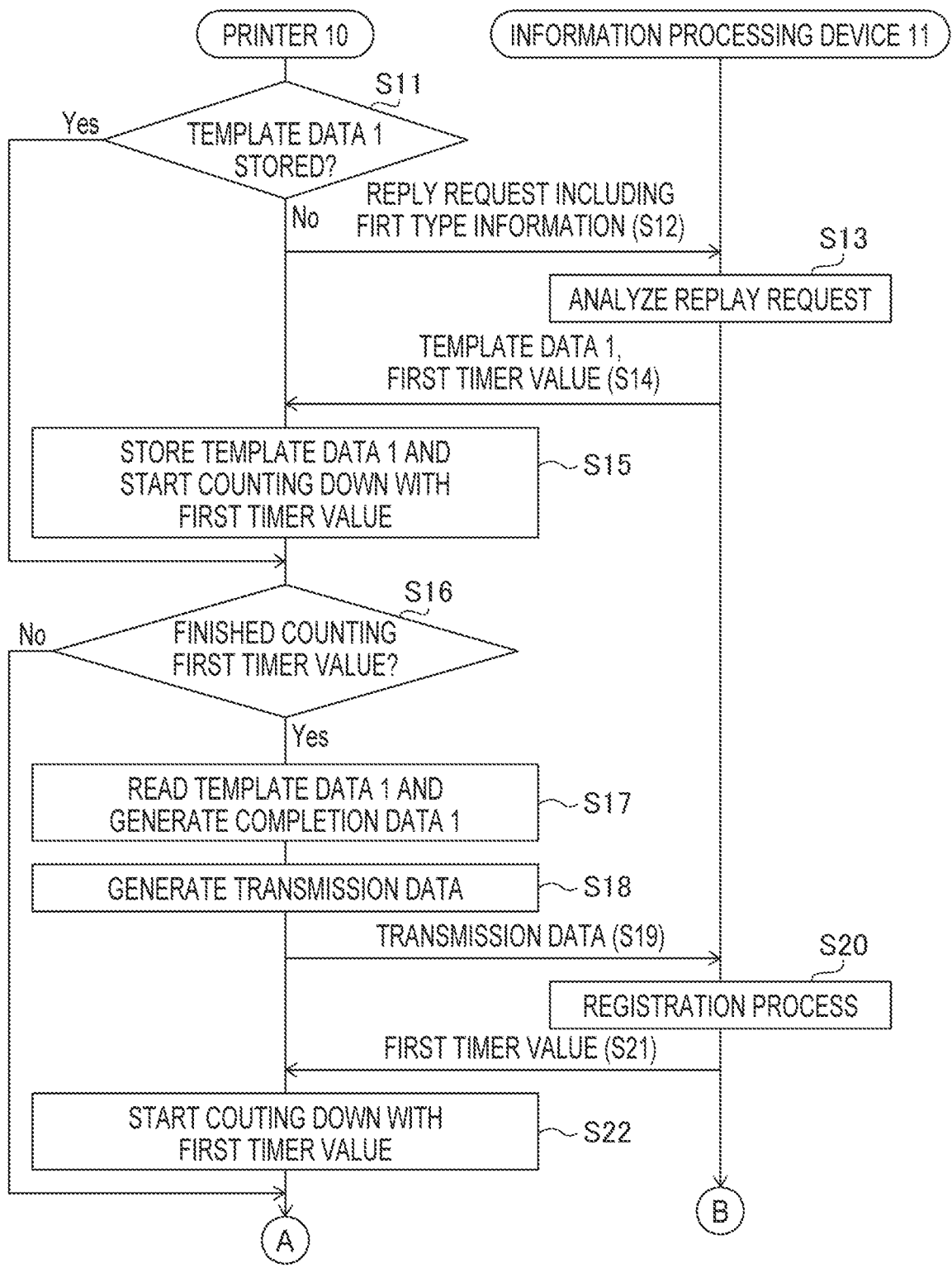
FIGS. 6-9 show a process performed by a printer to obtain template data from the information processing device.

As shown in FIG. 2, the printer 10 includes a housing 20, and a panel assembly 21, a cover 22, a sheet feed tray 23 and a sheet discharge tray 24 that are held by the housing 20.

The panel assembly 21 includes a panel body 41, and a touch panel 42 and a plurality of operation switches 45 held by the panel body 41. The panel body 41 has a rectangular plate shape and is attached to one surface of the housing 20. In the following description, in a state in which the printer 10 is placed on a horizontal surface, a front-rear direction 8 is defined with one surface of the housing 20 on which the panel body 41 is placed as a front surface, and a direction along a vertical direction is defined as an up-down direction 7. Further, the left and right when the printer 10 is viewed from the front are defined as a left-right direction 9. The front-rear direction 8 and the left-right direction 9 are parallel to the horizontal plane, are orthogonal to the up-down direction 7, and are orthogonal to each other.

As shown in FIG. 1, the touch panel 42 has a display panel 43 that displays an image, and a transparent film-shaped touch sensor 44 that is superimposed on the display panel 43. The touch sensor 44 outputs position information indicating a position on the display panel 43 touched by the user. The position information is, for example, coordinates (x, y) on the x-y plane when the upper left end of the display panel 43 is set as the origin, the right direction is set as the positive direction of the x-axis, and the downward direction is set as the positive direction of the y-axis.

The display panel 43 and the touch sensor 44 of the touch panel 42 are connected to a controller 51 described later by a cable or the like. The controller 51 outputs image data to the display panel 43 to cause the display panel 43 to display an image. The controller 51 also receives the position information output from the touch sensor 44. The controller 51 determines an object such as an icon displayed at the position indicated by the position information input from the touch sensor 44 as an object selected by the user.

Each of the operation switches 45 has a contact that is opened or closed in accordance with a user operation. The operation switches 45 output different voltage values that vary depending on whether the contact is opened or closed. The operation switches 45 are connected to the controller 51 by a cable or the like. The controller 51 determines whether the operation switches 45 have been operated by the user based on the voltage value input from the operation switch. It is noted that only one of either the touch sensor 44 or the operation switches 45 may be provided to the panel assembly 21.

As shown in FIG. 2, the sheet feed tray 23 is located at a lower portion of the housing 20 and is detachably held by the housing 20. The sheet discharge tray 24 is located at a lower portion of the housing 20 and above the sheet feed tray 23, and is held by the sheet feed tray 23 or the housing 20. The cover 22 is positioned at the right portion of the front surface of the housing 20 and is rotatably held by the housing 20. The cover 22 rotates between a closed position at which the cover 22 closes an opening 30 provided at the right portion of the housing 20 and an open position at which the cover 22 opens the opening 30. A mounting case 32 is disposed behind the opening 30 and held by the housing 20. The mounting case 32 has a configuration of detachably holding the cartridges 13. Since this configuration is well known, detailed description thereof will be omitted.

The mounting case 32 detachably holds the plurality of cartridges 13. In the illustrated example, the mounting case 32 detachably holds four cartridges 13. Each of the four cartridges 13 stores, for example, ink of one of magenta, cyan, yellow, and black colors. That is, the printer 10 is a so-called inkjet printer and is a so-called color printer. However, the mounting case 32 may detachably hold only one cartridge 13 storing ink of black color. That is, the printer 10 may be a so-called monochrome printer. The mounting case 32 may detachably hold one or more cartridges 13 each containing toner instead of ink. That is, the printer 10 may be a so-called laser printer.

The mounting case 32 has a cartridge I/F 49 shown in FIG. 1. The cartridge I/F 49 includes, for example, terminals each corresponding to one of the cartridges 13. The cartridge I/F 49 is set at a position where it contacts with electrodes of IC chips 14 which the cartridges 13 mounted in the mounting case 32 have. The cartridge I/F 49 is connected to the controller 51 described later by a cable.

It is noted that the cartridge I/F 49 may be an antenna. For example, as the cartridge I/F 49, a substrate having a pattern antenna is disposed in the mounting case 32. A similar antenna may be provided to the IC chips14. The cartridge I/F 49 outputs radio wave to be received by the antenna of an IC chip 14 and the antenna of the IC chip 14 receives the output radio wave. That is, the cartridge I/F 49 receives information or data from the IC chip 14 and transmits information or data to the IC chip 14 by way of radio wave.

The cartridge I/F 49 may also be a light emitting diode and a photodiode. For example, as the cartridge I/F 49, a substrate having a light emitting diode and a photodiode is disposed in the mounting case 32. The IC chip 17 includes a similar light emitting diode and photodiode. The cartridge I/F 49 emits light to be received by the photodiode of the IC chip 17 and receives light emitted by the light-emitting diode of the IC chip 17. That is, the cartridge I/F 49 may receive information or data from the IC chip 17 and transmit information or data to the IC chip 17 by way of light.

A liquid level sensor 38 is provided to the mounting case 32. The liquid level sensor 38 is, for example, a photo interrupter having a light emitting diode and a photodiode. The liquid level sensor 38 is provided such that the cartridge 13 mounted in the mounting case 32 is positioned on an optical path between the light emitting diode and the photodiode. The cartridge 13 has a light-transmitting property at a portion positioned on the optical path. For example, at least a part of the cartridge 13 is manufactured by using a resin molded product having a light-transmitting property.

The liquid level sensor 38 is positioned such that the above-described optical path is between an upper end and a lower end of the cartridge 13 in the up-down direction 7. In the illustrated example, the optical path of the liquid level sensor 38 is positioned below an intermediate position between the upper end and the lower end of the cartridge 13 in the up-down direction 7. The liquid level sensor 38 outputs a first detection signal when ink is on the optical path, and outputs a second detection signal different from the first detection signal when ink is not on the optical path. In the following description, the position of the optical path of the liquid level sensor 38 is referred to as a "detection position."

The liquid level sensor 38 is connected to the controller 51 using a cable or the like. That is, the first detection signal and the second detection signal output from the liquid level sensor 38 are input to the controller 51. The controller 51 determines whether a liquid level of the ink stored in the cartridge 13 mounted in the mounting case 32 has reached the detection position based on whether the signal input from the liquid level sensor 38 is the first detection signal or the second detection signal. Details will be described later.

The cartridge 13 has a box shape having an internal space for storing ink. Since the basic configuration of the cartridge 13 is well known, detailed description thereof will be omitted. The cartridge 13 includes the IC chip 14. In the illustrated example, the IC chip 14 is attached to an upper surface of the cartridge 13. The IC chip 14 has an electrode that contacts the cartridge I/F 49, which is a terminal, and an IC memory 15 electrically connected to the electrode. Alternatively, the IC chip 14 has an antenna such as a pattern antenna, or a light emitting diode and a photodiode in place of the electrode. The IC memory 15 stores various information. Specifically, the IC memory 15 stores a model number, usage type information, an initial storage amount value, a CTG serial number.

The model number is identification information assigned to the cartridge 13 in accordance with the color of ink stored in the cartridge 13 and the type of ink such as dye or pigment. The usage type information is information indicating whether the cartridge 13 is a cartridge be to be used in the contract usage mode or a cartridge to be used in the normal usage mode. For example, the usage type information is 1-bit data that is stored at a predetermined address of the IC memory 15 and that indicates "0" or "1." For example, "1" indicates that the cartridge is to be used in the contract usage mode, and "0" indicates that the cartridge is used in the normal usage mode. However, the usage type information may be included in the model number. That is, one model number may indicate the color and type of one ink and whether the ink is to be used in the normal usage mode or the contract usage mode. It is noted that, in a case where the printer 10 is a dedicated printer for use only in a mode that the user uses the printer after concluding a contract with the service provider, the usage type information is not stored in the IC memory 15.

The initial storage amount value indicates an initial amount of ink stored in the cartridge 13. The initial storage amount value is used for calculation of the remaining amount of ink in the cartridge 13 and the like by the controller 51. The serial number is a number for identifying each cartridge 13. The serial number is used by the controller 51 to determine whether the cartridge 13 has been replaced. For example, in response to the serial number obtained from the IC memory 15 not matching the serial number stored in the memory 53, the controller 51 described later determines that the cartridge 13 has been replaced. Details will be described later.

The housing 20 holds a print engine 40 therein. The print engine 40 mainly includes a sheet feed roller 25, a conveying roller 26, a discharge roller 27, a platen 28, and a recording unit 29. The sheet feed roller 25 is held by a frame provided in the housing 20 so as to be able to contact a sheet 6 placed on the sheet feed tray 23. The sheet feed roller 25 is rotated by a motor. The rotating sheet feed roller 25 feeds the sheet 6 to a conveyance path 37. The conveyance path 37 is a space defined by a guide member. In the illustrated example, the conveyance path 37 extends in a curved manner from a rear end of the sheet feed tray 23 to a position above the sheet feed tray 23, and then extends forward.

The conveying roller 26 is located downstream of the sheet feed tray 23 in a conveying direction of the sheet 6. The conveying roller 26 and a driven roller 35 constitute a roller pair. The conveying roller 26 is rotated by a motor. The rotating conveying roller 26 and driven roller 35 convey the sheet 6 fed to the conveyance path 37 by the sheet feed roller 25 while nipping the sheet 6. The discharge roller 27 is located downstream of the conveying roller 26 in the conveying direction of the sheet 6. The discharge roller 27 and a driven roller 36 constitute a roller pair. The discharge roller 27 is rotated by a motor. The rotating discharge roller 27 and driven roller 36 convey the sheet 6 while nipping the sheet 6, and discharge the sheet 6 on the sheet discharge tray 24. The platen 28 is located between the conveying roller 26 and the discharge roller 27 in the front-rear direction 8, and downstream of the conveying roller 26 and upstream of the discharge roller 27 in the conveying direction of the sheet 6.

The recording unit 29 is located above the platen 28. The recording unit 29 may be held by a guide rail that is a part of the frame so as to be movable in the left-right direction 9, or may be fixed to the frame. That is, the printer may be a so-called serial printer or a so-called line printer. The recording unit 29 has a head 34. The head 34 has channels therein through which ink flows. The channels communicate with the internal space of the cartridge 13 mounted in the mounting case 32 via a tube 31. That is, the ink stored in the cartridge 13 is supplied to the head 34 through the tube 31.

As shown in FIG. 1, the head 34 has a driving element 50. A portion of the driving element 50 constitutes a channel inside the head 34. The driving element 50 is electrically connected to the controller 51 by a cable or the like. The driving element 50 is a piezoelectric element or a heater. The driving element 50 being a piezoelectric element deforms by being supplied with a direct current voltage, applies pressure to ink in the channel, and causes ink droplets to be ejected from a nozzle being an opening of the channel The driving element 50 being a heater generates heat by being supplied with a direct current voltage, causes ink in the channel to bump, and causes ink droplets to be ejected from the nozzle.

The number of ink droplets ejected from the nozzle can be specified from the number of times of supply of the direct current voltage or a direct current to the driving element 50. That is, the controller 51 calculates a count value of the number of ejected ink droplets by counting the number of times of the supply. The count value is used for calculation of the remaining amount of ink and the like. Details will be described later.

The printer 10 further includes a controller 51, a timer counter 48, and a communication I/F 47 (see FIG. 1). The timer counter 48 is configured to measure time by, for example, counting the number of waves of a clock frequency. The communication I/F 47 is connected to a local network, such as a wired LAN (Local Area Network) (registered trademark) or a wireless LAN. The local network is connected to the Internet 12 via a router 16. Alternatively, the communication I/F 47 may be connected to a terminal device such as a personal computer or a tablet via a communication cable such as a USB cable. The terminal device is connected to the Internet 12 via a communication cable, a local network, and a router 16. In other words, the printer 10 is connected to the Internet 12 via the router 16.

The controller 51 includes a CPU 52, memory 53, and a communication bus 54. The CPU 52, the memory 53, the touch panel 42, the operation switches 45, the communication I/F 47, and the cartridge I/F 49 are connected to the communication bus 54. That is, the CPU 52 is connected to the memory 53, the touch panel 42, the operation switches 45, the communication I/F 47 and the cartridge I/F 49 via the communication bus 54 so as to be able to exchange information and data with each other.

The memory 53 includes a ROM 55, a RAM 56, and an EEPROM 57. The ROM 55 stores an OS 58 being an operating system and a control program 59 in advance. s described in the OS 58 and the control program 59 are executed by the CPU 52. That is, the OS 58 and the control program 59 are executed by the CPU 52. The OS 58 and the control program 59 executed by the CPU 52 causes the display panel 43 to display an image and receives an input from the user through the touch sensor 44 and/or the operation switches 45. The OS 58 and the control program 59 executed by the CPU 52 transmit and receive information and data through the communication I/F 47 and the cartridge I/F 49, and stores the received information and data in the memory 53.

The control program 59 may be a single program or a program including a plurality of modules. The control program 59 has, for example, a UI module, a communication module, and a print control module. Every module is executed quasi-concurrently by so-called multitasking.

The UI module is a program that inputs image data to the display panel 43, causes the display panel 43 to display an image including objects such as icons, and receives a signal output from the touch sensor 44 and/or the operation switches 45.

The communication module is a program that transmits and receives information and data according to a communication protocol of the communication line to which the communication I/F 47 is connected. For example, when the communication I/F 47 is connected to a USB cable, the communication module transmits and receives information and data using a communication protocol such as RS232C. When the communication I/F 47 is connected to a LAN cable or to a wireless LAN, the communication module transmits and receives information and data using a communication protocol such as TCP/IP.

The print control module is a program that generates and outputs drive signals to be input to the drive circuits of the motors and driving elements 50 described above, based on the print data.

The RAM 56 is used for execution of the OS 58 and the control program 59, and also temporarily stores information and data during execution of the OS 58 and the control program 59. The EEPROM 57 stores first and second threshold values and a model name in advance. The first threshold value, the second threshold value and the model name may be stored in ROM 55 instead of the EEPROM 57.

In addition, the EEPROM 57 stores destination addresses that the controller 51 obtains through IC memory 15, the touch sensor 44, the operation switches 45, the communication I/F 47, and the like. The destination addresses are a URL and/or IP address published by the information processing device 11. In the following description, a serial number of the printer 10 will be referred to as a printer serial number to distinguish the same from a CTG serial number, which is a serial number of the cartridge 13. The printer serial number is an example of identification information of the printer 10 itself. In addition to the printer serial number, the identification information of the printer 10 itself may be the MAC address, the IP address, or the user ID of the printer 10.

The EEPROM 57 stores various template data that the controller 51 obtains from the information processing device 11 through the communication I/F 47. With reference to FIGS. 4 and 5, the template data will be described in detail.

Template data 1 shown in FIG. 4A and FIG. 4B is template data used for transmitting basic device information such as the remaining amount value and the waste ink amount. Template data 2 shown in FIG. 4D is template data used to notify the information processing device 11 that the amount of ink stored in the cartridge 13 has become low. Template data 3 shown in FIG. 5A is template data used to notify the information processing device 1 lthat the cartridge 13 has been replaced in the printer 10. Template data 4 shown in FIG. 5B is template data used to notify the information processing device 11 that the ink stored in the cartridge 13 has been used up. Template data 5 shown in FIG. 5C is template data used to notify the information processing device 11 that a paper jam or other failure has occurred in the printer 10. Template data 6 shown in FIG. 5D is template data used to notify the information processing device 11 that the failure has been resolved. The template data 1 shown in FIG. 4A and FIG. 4B is an example of first template data.

The template data 1 shown in FIG. 4A is the template data used by a first service provider. The template data 1 shown in FIG. 4B is the template data used by a second service provider, which is different from the first service provider. In the following, the template data 1 shown in FIG. 4A will be referred to as the "first service provider template 1" and the template data 1 shown in FIG. 4B will be referred to as the "second service provider template 1." The first service provider template 1 and the second service provider template 1 are different from each other in the field names and the data format of the field names. field names are an example of first format data and second format data. In the first service provider template 1, "% serial_number %" is associated with a field name "SERIAL NUMBER," while in the second service provider template 1, "% serial_number %" is associated with a field name "serial_number." Further, in the first service provider template 1, "% firm_version %" is associated with a field name "FIRM VERSION." In the second service provider template 1, "% firm_version %" is associated with a field name "program_ver."

In the first service provider template 1 shown in FIG. 4A, "% serial_number %" associated with the "SERIAL NUMBER" is replacement data that specifies information to be replaced. The memory 53 of the printer 10 stores a piece of device information associated with "% serial_number %." For example, the EEPROM 57 or the ROM 55 of the memory 53 stores a printer serial number such as "12345678" that is associated with "% serial_number %." The control program 59 of the printer 10 identifies pieces of device information each specified by a piece of replacement data, and generates completion data by replacing the pieces of replacement data with the identified pieces of device information. In the example shown in FIG. 4C, the control program 59 replaces a piece of replacement data "% serial_number %" with a piece of device information "12345678," replaces "%firm_version % " with "A001," and replaces "% print_page %" with "130." In addition, the control program 59 replaces "waste_ink" with "10", and "% remaining_amount %" with "4, 5, 6, 7." The ink remaining amount "4" indicates the remaining amount of the ink of the magenta color, "5" indicates the remaining amount of the ink of the cyan color, "6" indicates the remaining amount of the ink of the yellow color, and "7" indicates the remaining amount of the ink of the black color. The replacement data "% serial_numbe r%" is an example of first replacement data. The pieces of replacement data "% print_page %" and "% remaining_amount %" are examples of second replacement data. The values "130" and "4, 5, 6, 7" are examples of detailed information and consumable information.

Processes in which the control program 59 generates and transmits the completion data to the information processing device 11 using the remaining amount value indicating the remaining amount of the ink and the like will be described with reference to FIGS. 4A-4D, 5A-5D and 6-11. In the following description, actions performed by the control program 59 will be described as those performed by the controller 51 (especially the CPU 52).

First, a counting process shown in FIG. 10A, a remaining amount value calculation process shown in FIG. 10B, and a failure determination process shown in FIG. 10C will be described. The counting process is a process to calculate the total count value indicating the amount of ink flowed out from the head 34 and store the calculation result in the memory 53. The remaining amount value calculation process is a process of calculating the remaining amount value, which indicates the amount of ink stored in the cartridge 13 installed in the mounting case 32, based on the total count value. The failure determination process is a process that is executed when a failure occurs.

First, the counting process shown in FIG. 10A will be described. The counting process is performed in response to the ink flowing out of the print head 34. For example, the controller 51 performs the counting process in response to inputting print data to the print engine 40 and instructing the print engine 40 to execute printing. Alternatively, the controller 51 may perform the counting process in response to driving a pump of a maintenance mechanism. Further alternatively, the controller 51 may perform the counting process in response to the driving element 50 being driven for maintenance of the head 34.

First, the controller 51 counts the number of times the driving element 50 has been driven and obtains the count value (S91). The count value indicates the number of times the ink droplets were ejected from the nozzles of the head 34, i.e., the amount of the ink that flowed out of the head 34. In the case where the pump described above is driven, the controller 51 determines the count value by converting the amount of ink sucked out of the head 34 by the pump into the number of times the ink drops are ejected (S91). Although not shown in the flowchart, the controller 51 stores the determined count value in the EEPROM 57 in response to determining the count value indicating the amount of ink sucked from the head 34 by the pump. The count value stored in the EEPROM 57 is an accumulated value. That is, the controller 51 accumulates the determined count value to a waste-ink count value stored in the EEPROM 57 and stores the accumulated value in the EEPROM 57 as a new waste-ink count value. The waste-ink count value is associated with "% waste_ink %." For example, the controller 51 stores the waste-ink count value in the EEPROM 57 in association with "% waste_ink %" by storing the waste-ink count value in a particular storage area defined as a storage area where device information corresponding to "% waste_ink %" is to be stored. In other words, "% waste_ink %" indicates the total amount of the ink sucked by the pump from the head 34 and discharged into a waste tank. The service provider determines whether a pad contained in the waste tank should be replaced by monitoring, for example, data in "% waste_ink %."

Next, the controller 51 determines whether the signal input from the liquid level sensor 38 has changed from the first detection signal to the second detection signal before the ink flows out of the head 34 and after the ink flows out (S92). That is, in S92, the controller 51 determines whether the liquid level of the ink stored in a cartridge 13 mounted on the mounting case 32 has fallen below a detection position due to the outflow of ink from the head 34. When the controller 51 determines that the signal input from the liquid level sensor 38 has changed from the first detection signal to the second detection signal (S92: second detection signal), the controller 51 stores a sensor flag with a value of "ON" in the EEPROM 57 of the memory 53 (S93). The initial value of the sensor flag is "OFF." In addition, the controller 51 resets a total count value. The total count value is a value that indicates the total amount of ink flowed out from the print head 34. Thus, when the liquid level of the ink stored in the cartridge 13 mounted on the mounting case 32 reaches or lowers to the detection position, the total count value is reset once. On the other hand, when the controller 51 determines that the signal input from the liquid level sensor 38 has not changed from the first detection signal to the second detection signal (S92: first detection signal), the controller 51 skips steps S93 and S94.

The controller 51 adds the count value determined in step S91 to the total count value stored in EEPROM 57 and stores the result in EEPROM 57 as a new total count value (S95). When the sensor flag is "OFF," the total count value indicates a consumption amount of the ink stored in the cartridge 13 mounted in the mounting case 32, which is an amount of the ink consumed from the initial storage amount. When the sensor flag is "ON," the total count value indicates the consumption amount from a state in which the liquid surface of the ink stored in the cartridge 13 mounted in the mounting case 32 is at the detection position. A fixed storage value indicating the amount of ink stored in the cartridge 13 in the state in which the liquid surface of the ink stored in the cartridge 13 mounted in the mounting case 32 is at the detection position is stored in advance in the ROM 55 or EEPROM 57. In the remaining amount value calculation process described later, the total count value when the sensor flag is "OFF" will be described as a first total count value, and the total count value when the sensor flag is "ON" will be described as a second total count value.

The first total count value and the second total count value may be separately stored in the EEPROM 57 without resetting the total count value in step S94.

Then, the controller 51 executes a process corresponding to a determination as to whether the cartridge 13 has been replaced (S96). An example of the determination will be described. When the cartridge 13 is mounted in the mounting case 32, the controller 51 obtains the CTG serial number from the IC memory 15 through the cartridge I/F 49. Then, the controller 51 determines whether the CTG serial number stored in the EEPROM 57 of the memory 53 matches the CTG serial number obtained from the IC memory 15. In response to determining that the CTG serial number stored in the EEPROM 57 of the memory 53 does not match the CTG serial number obtained from the IC memory 15, the controller 51 determines that the cartridge 13 has been replaced. In response to determining that the cartridge 13 has been replaced, the controller 51 overwrites the CTG serial number stored in the EEPROM 57 of the memory 53 with the CTG serial number obtained from the IC memory 15.

Although not shown in the flowchart, when the controller 51 determines that the cartridge 13 has been replaced, the controller 51 stores information "replaced" which indicates that the replacement of the cartridge 13 has been completed, in the EEPROM 57 of the memory 53 in association with "% event_content %." Further, the controller 51 stores a piece of device information such as "magenta" indicating the color of the replaced ink in the EEPROM 57 in association with "% ink_color %." Furthermore, the controller 51 stores a piece of device information such as "M9876" which indicates the model number of the replaced cartridge in the EEPROM 57 in association with "% cartridge_modelnumber %." For example, the controller 51 stores "replaced," "M9876," and "magenta" in a particular storage area which has been defined as a storage area in which the pieces of device information corresponding to "% event_content% ," "% cartridge_modelnumber %," and "% ink_color %" are stored, respectively. These pieces of device information are erased from the memory 53, for example, in response to the transmission data including the template data described later being transmitted to the information processing device 11. The information "replaced" is an example of detailed information and cartridge replacement information.

When the controller 51 determines that the cartridge 13 has been replaced (S96: Yes), the controller 51 resets the total count value stored in EEPROM 57 (S97) and ends the counting process. On the other hand, when the controller 51 determines that the cartridge 13 has not been replaced (S96: No), the controller 51 stores the sensor flag having the value of "OFF" in the EEPROM 57 (S98) and ends the counting process.

Next, the remaining amount value calculation process will be described with reference to FIG. 10B. For example, in response to determining to display the remaining amount of ink on the display panel 43, or in response to determining to transmit the remaining amount of ink to the information processing device 11, the controller 51 executes the remaining amount value calculation process. First, the controller 51 determines whether the value of the sensor flag stored in the EEPROM 57 is "ON" or "OFF" (S101). That is, in step S101, the controller 51 determines whether the total count value stored in the EEPROM 57 is the first total count value or the second total count value. When the controller 51 determines that the value of the sensor flag stored in the EEPROM 57 is "OFF" (S101: OFF), the controller 51 reads the initial storage value from the EEPROM 57 or from the IC memory 15 through the cartridge I/F 49 (S102). The controller 51 further reads the first total count value from the EEPROM 57 (S103). Then, the controller 51 calculates the remaining amount value by subtracting the read first total count value from the read initial storage value (S104).

On the other hand, when the controller 51 determines that the value of the sensor flag stored in the EEPROM 57 is "ON" (S101: ON), the controller 51 reads the fixed storage value from the ROM 55 or the EEPROM 57 (S105). The controller 51 further reads the second total count value from the EEPROM 57 (S106). Then, the controller 51 calculates the remaining amount value by subtracting the read second total count value from the read fixed storage value (S107). The controller 51 stores the remaining amount value calculated in step S104 or step S107 in the RAM 56 or the EEPROM 57 (S108), and ends the remaining amount value calculation process.

Figure 10A:
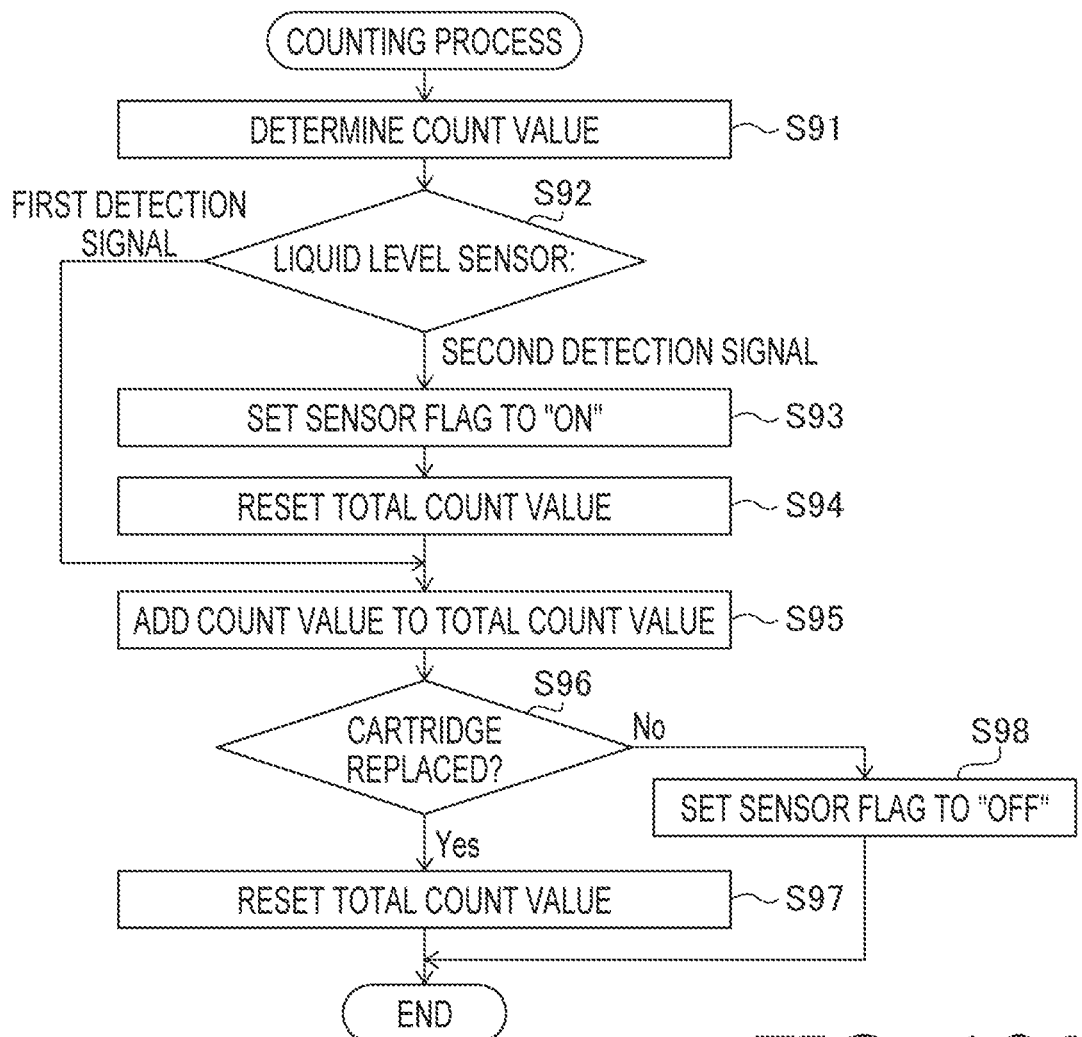
FIG. 10A is a flowchart illustrating a counting process.
Figure 10B:
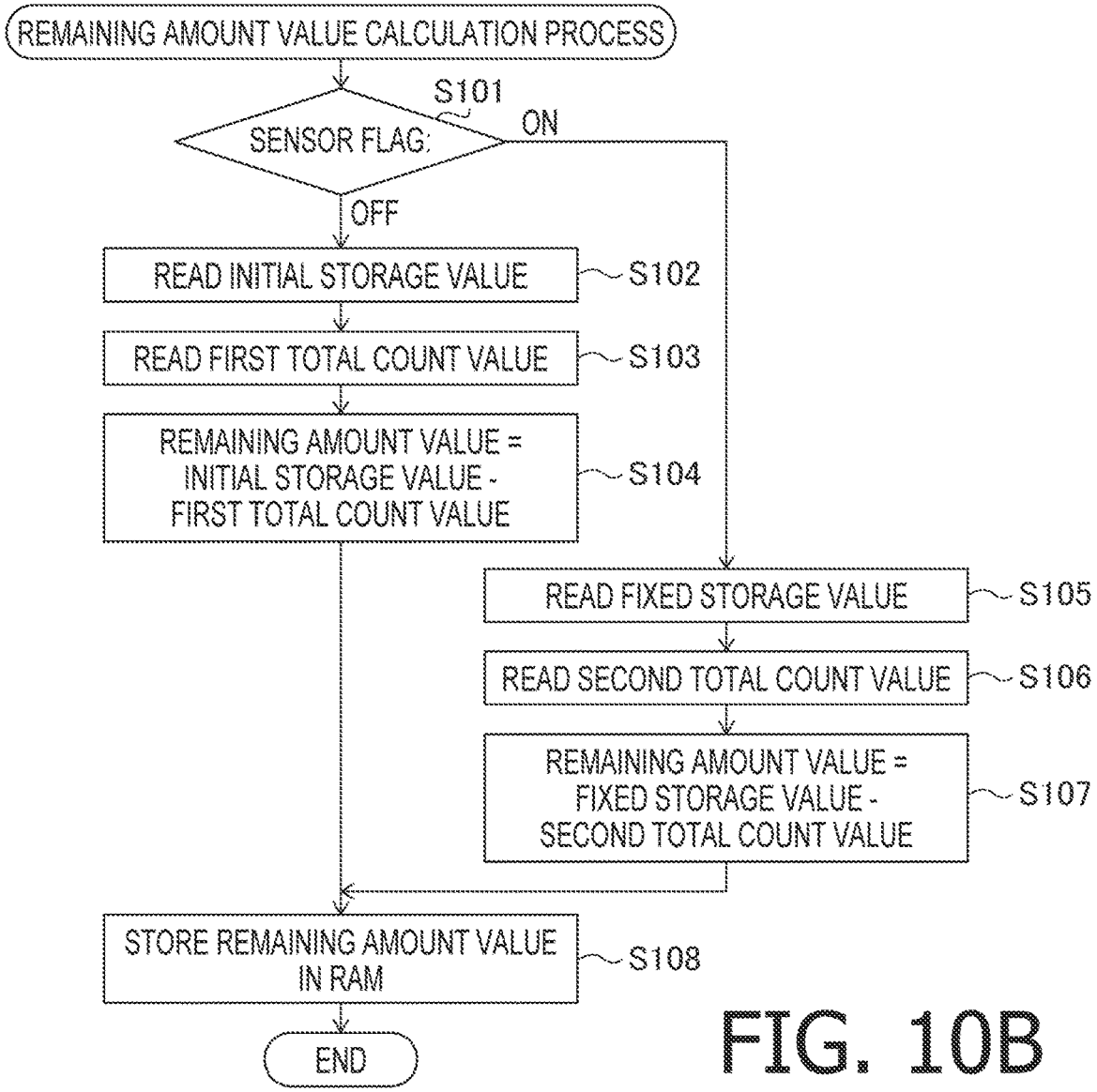
FIG. 10B is a flowchart illustrating a remaining amount value calculating process.
Figure 10C:
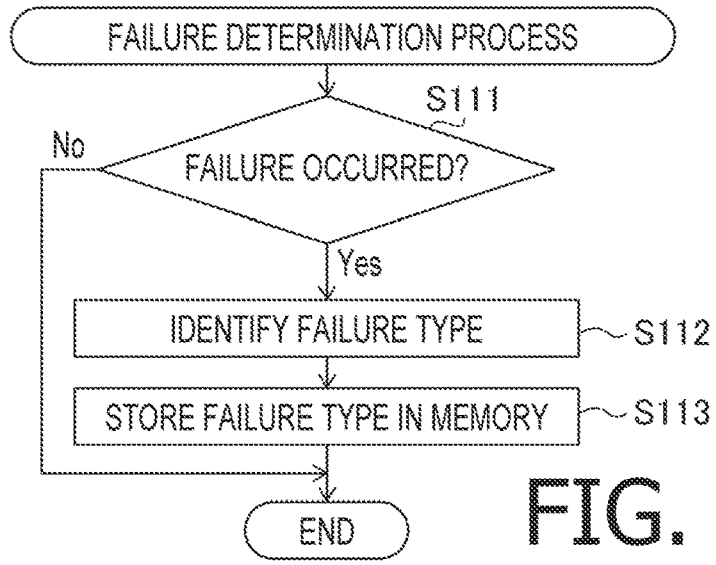
FIG. 10C is a flowchart illustrating a failure determining process.

The counting process illustrated in FIG. 10A and the remaining amount value calculation process illustrated in FIG. 10B are executed for all the cartridges 13 mounted in the mounting case 32. That is, the counting process and the remaining amount value calculation process are executed for each of the inks of magenta, cyan, yellow, and black. Then, in step S108, the remaining amount value of each color is stored in the memory 53. The remaining amount of each color is stored in the memory 53 in association with "% remaining_amount %." For example, the controller 51 stores the remaining amount of each color in a particular storage area which is set in advance as a storage area in which information indicating "% remaining_amount %" is to be stored, thereby storing the remaining amount of each color in association with "% remaining_amount %."

Next, the failure determination process will be described with reference to FIG. 10C. For example, the controller 51 periodically executes the failure determination process. First, the controller 51 determines whether a failure has occurred (S111). The failure includes not only a failure in the print engine 40 but also a failure in a scanner or the like when the printer 10 includes the scanner or the like. The failure is a paper jam or the like. Since the process of determining whether a failure has occurred by the controller 51 is well known, a detailed description thereof is herein omitted. When the controller 51 determines that no failure has occurred (S111: No), the controller 51 ends the failure determination process. On the other hand, when the controller 51 determines that a failure has occurred (S111: Yes), the controller 51 identifies a failure type (S112). Then, the controller 51 stores, in the EEPROM 57 of the memory 53, information indicating the failure in association with "% event_content %", and information indicating the type of failure in association with "% failure_type %". For example, the controller 51 stores information indicating a failure in a predetermined storage area allotted for a piece of device information corresponding to "% event_content %" (S113). The controller 51 stores information indicating a failure type such as a sheet jam in a predetermined storage area allotted for a piece of device information corresponding to "% failure_type %". The controller 51 end the failure determination process after performing step S113. A timing at which the controller 51 performs step S111 is an example of a particular timing. The pieces of replacement data "% event_content %" and "% failure_type %" are examples of the second replacement data. The information indicating a failure and the information indicating a failure type are examples of detailed information.

Although not shown in the flowchart, in addition to the counting process and the remaining amount value calculation process, the controller 51 performs the print count process to count the number of sheets 6 printed by the print engine 40. The controller 51 stores the number of sheets (hereinafter, referred to as a printed sheet count value), which indicates the number of sheets printed by the print engine 40, in the EEPROM 57 in association with "% print_page %." For example, the controller 51 stores the printed sheet count value in the particular storage area where the device information corresponding to "% print_page %" is stored, thereby storing the printed sheet count value in association with "% print_page %."

Next, processes performed by the control program 59 implemented in the printer 10 and the management program 68 implemented in the information processing device 11, respectively, will be described with reference to FIGS. 6 to 9. Mainly, a process in which the control program 59 obtains template data from the management program 68, generates completion data using the obtained template data, and transmits the generated completion data to the information processing device 11 will be described. In the following description, a process performed by the control program 59 will be described as a process performed by the controller 51, and a process performed by the management program 68 will be described as a process performed by the controller 61. Although not shown in the flowchart, the controller 51 of the printer 10 may perform the processes shown in FIGS. 6 to 9 using, for example, the above-described usage type information, obtained from the IC memory 15 through the cartridge I/F 49, indicating the contracted use mode. That is, the printer 10 is configured to transmit the device information to the information processing device 11 only when the cartridge 13 used in the contract usage mode is installed in the mounting case 32 of the printer 10.

The controller 51 of the printer 10 periodically performs the processes shown in FIGS. 6 to 9, for example. First, the controller 51 determines whether the template data 1, for example, is stored in the EEPROM 57 (S11). When, for example, the power is turned on for the first time after the printer 10 is installed and connected to the Internet 12, the controller 51 determines that the template data 1 is not stored in the EEPROM 57 (S11: NO). When the controller 51 determines that the template data 1 is not stored in the EEPROM 57 (S11: NO), the controller 51 transmits a request including a reply request to the information processing device 11 through the communication I/F 47 and the Internet 12 (S12). Concretely, the controller 51 transmits the request to a destination address stored in the EEPROM 57 of the memory 53. The request is an HTTP request that conforms to communication protocols such as HTTP and HTTPs. The reply request included in the request contains first type information. The reply request is, for example, a command that includes the first type information. The first type information is information indicating the template data 1. In other words, in S12, the controller 51 requests the information processing device 11 to transmit the template data 1 in reply. The first type information is an example of template designation information.

The controller 61 of the information processing device 11 receives the request including the reply request through the communication I/F 64 (S12). The controller 61 analyzes the received reply request (S13). Concretely, the controller 61 determines the type of template data requested by the reply request. The memory 66 of the information processing device 11 stores in advance the first type information and the template data 1 in an associated manner The controller 61 generates a response including the template data 1 that is associated with the first type information included in the reply request. The template data 1 included in the response generated by the controller 61 is template data having field names described in a data format that can be processed by the management program 68. The same applies to template data 2 to template data 6 described later.

The controller 61 of the information processing device 11 transmits the generated response to the printer 10 through the communication I/F 64 and the Internet 12 (S14). The response generated by the controller 61 includes a first timer value as well as the template data 1. The first timer value is information that indicates a transmission timing at which the printer 10 transmits the next request. The first timer value indicates, for example, a period of time such as 3 hours, 6 hours, or 24 hours. The details will be described later. A period indicated by the first timer value is an example of a first period.

The controller 51 of the printer 10 receives the response transmitted by the information processing device 11 through the communication I/F 47 (S14). Then, the controller 51 stores the template data 1 included in the received response in the EEPROM 57 and starts the timer counter 48 to count down with the first timer value as an initial value (S15). On the other hand, when the controller 51 determines that the template data 1 is stored in the EEPROM 57 (S11: YES), the controller 51 skips steps S12 to S15.

The controller 51 of the printer 10 determines whether the timer counter 48, which started counting down with the first timer value as the initial value, has finished counting the first timer value (S16). It is noted that the timer counter 48 may not be a timer counter that counts down but a timer counter that counts up. In such a case, the controller 51 determines in S16 whether the count value of the timer counter has reached the first timer value. When the controller 51 determines that the timer counter 48 has not finished the count (S16: NO), the controller 51 skips steps S17 to S22 described below. When the controller 51 determines that the timer counter 48 has finished the count (S16: YES), the controller 51 reads the template data 1 from the EEPROM 57 and generates completion data 1 based on the read template data 1 (S17).

Although not shown in FIG. 4A, the template data 1 has a command that can be interpreted by the controller 51 of the printer 10. The command instructs the controller 51 to replace replacement data such as "% serial_number %" with information indicated by the replacement data. In accordance with the command, the controller 51 identifies the device information designated by the replacement data in the memory 53, and replaces the designated device information with the replacement data. Concretely, the controller 51 identifies "12345678," which is the printer serial number stored in the memory 53 in association with "% serial_number %," and replaces "% serial_number %" with the identified number "12345678." Further, the controller 51 identifies "A001" which is the version of the control program 59 stored in the memory 53 associated with "% firm_version %," and replaces "% firm_version %" with the identified version number "A001." Furthermore, the controller 51 identifies a value "130" which is the count value of the number of printed pages stored in the EEPROM 57 of the memory 53 associated with "% print_page %," and replaces "% print_page %" with the identified number "130." Further, the controller 51 identifies a value "10" which is the waste count value stored in the EEPROM 57 of the memory 53 associated with "% waste_ink %" and replaces "% waste_ink %" with the identified value "10." Still further, the controller 51 identifies the remaining amount values "4, 5, 6, 7" each indicating a remaining amount of ink stored in the RAM 56 or the EEPROM 57 of the memory 53 associated with "% remaining_amount %," and replaces "% remaining_amount %" with the identified values "4, 5, 6, 7." In the example shown in the figure, "% serial_number %," "% firm_version %," "% print_page %," "% waste_ink %," and "% remaining_amount %" are shown as the replacement data. However, the replacement data is not necessarily limited to the above. For example, the replacement data such as "% printer_model %," which is to be replaced with the model name of the printer 10, may be included in the template data 1.

After generating the completion data 1 based on the read template data 1 (S17), the controller 51 of the printer 10 generates transmission data that includes the generated completion data 1 (S18). The transmission data is, for example, a command that includes the completion data 1. The command is a command that instructs the controller 61 of the information processing device 11 to register the device information contained in the completion data 1 in the database. The controller 51 transmits a request including the generated transmission data to the information processing device 11 indicated by the destination address stored in the memory 53 through the communication I/F 47 and the Internet 12 (S19).

The controller 61 of the information processing device 11 receives the request transmitted by the printer 10 (S19). Then, the controller 61 registers the device information contained in the completion data 1 in the database (S20). This will be described in detail with reference to FIG. 11. First, the controller 61 identifies one record registered in the database using the serial number "12345678" included in the completion data 1. Then, the controller 61 identifies, in the identified record, a field that matches a field contained in the completion data 1. The controller 61 registers device information that is associated with the field name in the completion data 1 to the identified field. Concretely, the controller 61 registers "4, 5, 6, 7" in a field of "Remaining Ink Amount," "10" in a field of "Wasted Liquid Amount," and "130" in a field of "Number of Printed Sheets." In order to identify one record in the database, template data 2 to template data 6 described below all have the replacement data of "% serial_number %."

When the printer 10 transmits only device information such as "4, 5, 6, 7," "10," "130," and the like but not the field names, the management program 68 cannot determine with which field name each piece of the device information transmitted by the printer 10 should be associated to be registered in the database. Even in the case where the printer 10 transmits the field names and the device information, if the field names are described in a data format that the management program 68 cannot process, the management program 68 cannot determine with which field name each piece of the device information should be associated to be registered in the database. When the template data 1 has field names described in a data format that can be processed by the management program 68, and the completion data 1 generated based on the template data 1 is transmitted to the information processing device 11, the management program 68 can register the device information in the database.

Although not shown in the flowchart, the controller 61 of the information processing device 11 receives the operation of the service provider through the user I/F 63 and displays the information registered in the database on the display 62.

After executing the registration process of S20, the controller 61 generates a response including the first timer value. The controller 61 transmits the generated response to the printer 10 through the communication I/F 64 and the Internet 12 (S21).

The controller 51 of the printer 10 receives, through the communication I/F 47, the response transmitted by the information processing device 11 (S21). Then, the controller 51 causes the timer counter 48 to start counting down with the first timer value included in the received response as an initial value (S22).

Figure 7:
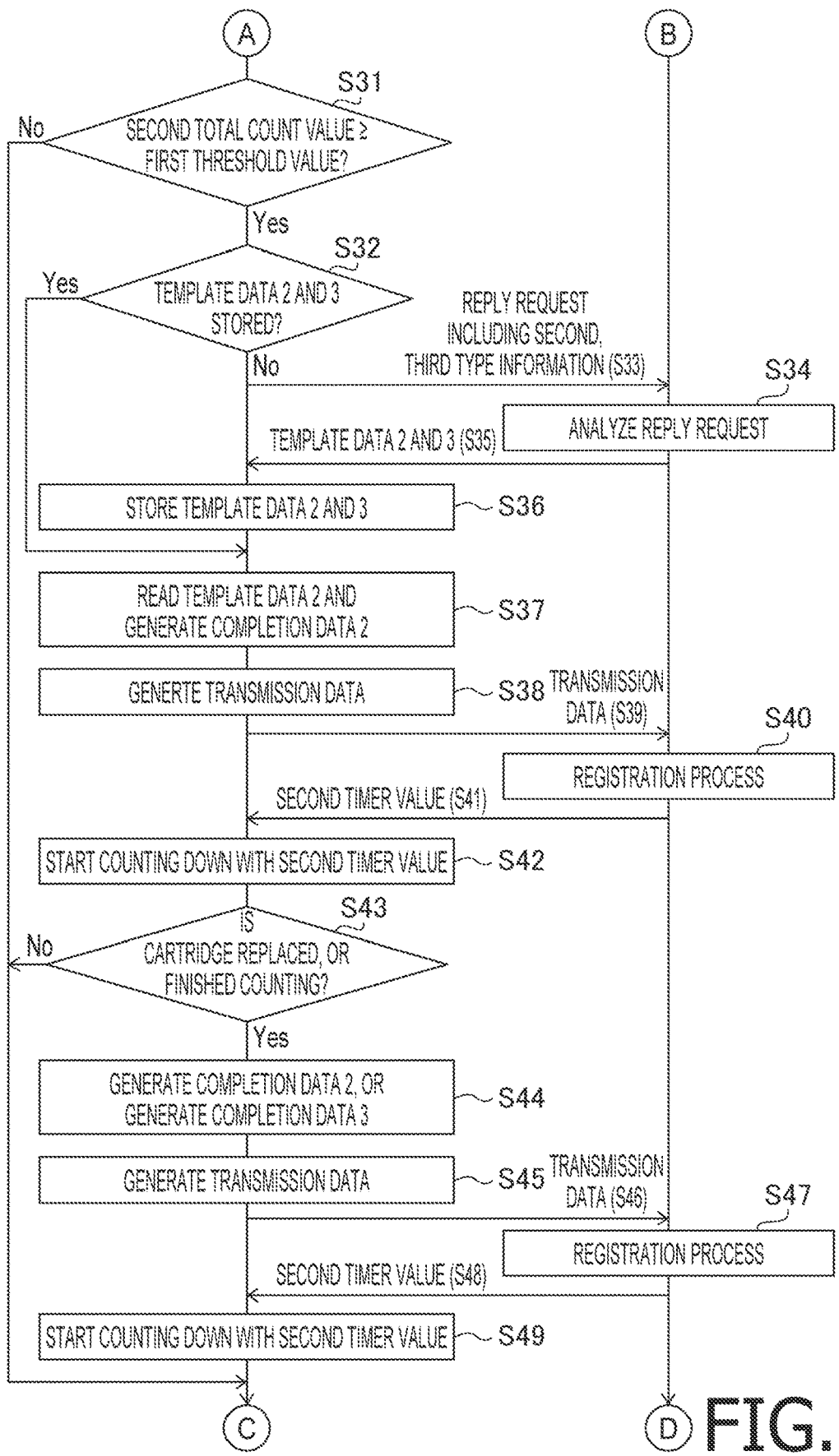

Next, as shown in FIG. 7, the controller 51 of the printer 10 determines whether the second total count value stored in the EEPROM 57 in the above-described counting process (FIG. 10A) is greater than or equal to the first threshold value stored in the EEPROM 57 (S31). That is, in S31, it is determined whether the ink of which amount is greater than or equal to the amount of ink indicated by the first threshold value has flowed out of the head 34 after the liquid level of the ink stored in the cartridge 13 mounted on the mounting case 32 becomes lower than the detection position. In other words, in S31, it is determined whether the amount of the ink stored in the cartridge 13 mounted in the mounting case 32 has decreased. In step S31, the controller 51 determines whether the second total count value is greater than or equal to the first threshold value for all cartridges 13 mounted on the mounting case 32. Then, the controller 51 determines that the second total count value is less than the first threshold value according to the fact that the second total count value is less than the first threshold value for all the cartridges 13. On the other hand, the controller 51 determines that the second total count value is greater than or equal to the first threshold value according to the fact that the second total count value is less than to the first threshold value even for one cartridge 13 out of all the cartridges 13 installed in the mounting case 32. The timing at which step S31 is executed is an example of a particular timing. The first threshold value is an example of a threshold value.

When the controller 51 of the printer 10 determines that the second total count value is less than the first threshold value (S31: NO), the controller 51 skips steps S32 to S49 described below. On the other hand, when the controller 51 determines that the second total count value is greater than or equal to the first threshold value (S31: YES), the controller 51 determines whether the template data 2 and the template data 3 are stored in the EEPROM 57 of the memory 53 (S32). As described above, the template data 2 is template data for notifying the information processing device 11 that the amount of the ink stored in the cartridge 13 installed in the mounting case 32 is low. The template data 3 is template data for notifying the information processing device 11 that the cartridge 13 installed in the mounting case 32 has been replaced. The template data 2 is an example of second template data.

Although not shown in the flowchart, when the controller 51 determines that the second total count value is greater than or equal to the first threshold value (S31: YES), ink low information is stored in the EEPROM 57 of the memory 53 in association with "% event_content %." The ink low information is information indicating that there is a cartridge 13 storing a low amount of the ink. The controller 51 stores the model number of the cartridge 13 storing the low amount of the ink in the EEPROM 57 in association with "% cartridge_modelnunber %." For example, the controller 51 stores the ink low information in the EEPROM 57 in association with "% event_content %" by storing the ink low information in a particular storage area that is defined as a particular storage area in which a piece of device information corresponding to "% event_content %" is stored. In addition, by storing the model number in the particular storage area defined as the particular storage area where a piece of device information corresponding to "% cartrige_modelnunber %" is stored, the controller 51 stores the model number in the EEPROM 57 in association with "% cartrige_modelnunber %." The ink low information is an example of detailed information.

When the controller 51 of the printer 10 determines that the template data 2 and the template data 3 are stored in the EEPROM 57 of the memory 53 (S32: YES), the controller 51 skips steps S33 to S36. On the other hand, when the controller 51 determines that the template data 2 and the template data 3 are not stored in the EEPROM 57 of the memory 53 (S32: NO), the controller 51 transmits a request including a reply request to the information processing device 11 (S33). Concretely, the controller 51 transmits the request to the destination address stored in the EEPROM 57 of the memory 53. The reply request included in the request contains the second type information and the third type information. The reply request is, for example, a command that includes the second type information and the third type information. The second type information is information indicating template data 2. The third type information is information indicating template data 3. In other words, in S33, the controller 51 requests the information processing device 11 to transmit the template data 2 and the template data 3. The second type information and the third type information are examples of template designation information.

The controller 61 of the information processing device 11 receives the request including the reply request through the communication I/F 64 (S33). The controller 61 analyzes the received reply request (S34). Concretely, the controller 61 determines the type of the template data requested by the reply request. The memory 66 of the information processing device 11 stores, in advance, the second type information and the template data 2 in an associated manner, and the third type information and the template data 3 in an associated manner The controller 61 generates a response that includes the template data 2 and the template data 3. Then, the controller 61 transmits the generated response back to the printer 10 through the communication I/F 64 and the Internet 12 (S35).

The controller 51 of the printer 10 receives the response transmitted by the information processing device 11 through the communication I/F 47 (S35). Then, the controller 51 stores the template data 2 and template data 3 included in the received response in the EEPROM 57 (S36). Then, the controller 51 reads the template data 2 and generates completion data 2 based on the read template data 2 (S37). This will be described in detail with reference to FIG. 4D.

The controller 51 replaces the replacement data such as "% serial_number %" with the device information indicated by the replacement data in the same manner as in the template data 1. Concretely, the controller 51 replaces "% serial_number %" with "12345678," replaces "% event_content %" with "Ink Low," replaces "% ink_color %" with "magenta," which indicates the ink color. The controller 51 replaces "% cartrige_modelnumber %" with "M9876," which indicates the model number. In the example shown in FIG. 4D, "% serial_number %," "% event_content %," "% ink_color %," and "% cartridge_modelnumber %" are shown as the replacement data, but the replacement data is not necessarily limited to the above example.

After generating the completion data 2 (S37), the controller 51 of the printer 10 generates transmission data that includes the generated completion data 2 (S38). The transmission data is, for example, a command that includes the completion data 2. The command is a command that instructs the controller 61 of the information processing device 11 to register the device information contained in the completion data 2 in the database. The controller 51 transmits a request including the generated transmission data to the information processing device 11 indicated by the destination address stored in the memory 53 through the communication I/F 47 and the Internet 12 (S39).

The controller 61 of the information processing device 11 receives the request transmitted by the printer 10 (S39). Then, the controller 61 registers the device information contained in the completion data 2 in the database in the same manner as described above (S40). After performing the registration process of S40, the controller 61 generates a response that includes a second timer value. The controller 61 transmits the generated response to the printer 10 through the communication I/F 64 and the Internet 12 (S41). The second timer value is, for example, a value indicating a shorter period of time than that of the first timer value described above. The second timer value indicates, for example, a period of time such as 30 minutes, one hour, or two hours. The second timer value is an example of second timing information. The period indicated by the second timer value is an example of a second period.

Although not shown in the flowchart, the controller 61 of the information processing device 11 displays the information "Ink Low," "Magenta," and "M9876" on the display 62, corresponding to the field names "Event," "Ink Color," and "Cartridge Model Number," respectively. The service provider ships a cartridge 13 with the model number displayed on the display 62 to the user. The shipped cartridge 13 is delivered to the user. The user replaces the cartridge 13 that is installed in the mounting case 32 and of which ink has been used up with a new cartridge 13 that has been delivered.

The controller 51 of the printer 10 receives a response including the second timer value through the communication I/F 47 (S41). Then, the controller 51 causes the timer counter 48 to start counting down with the second timer value included in the received response as an initial value (S42). The controller 51 determines whether the timer counter 48 that started counting down with the second timer value as the initial value has finished counting the second timer value (S43). The controller 51 also determines whether the cartridge 13 mounted in the mounting case 32 has been replaced (S43). The determination of whether the cartridge 13 has been replaced is made in the same manner as described above. When the controller 51 determines that the timer counter 48 has not finished the count and that the cartridge 13 has not been replaced (S43: NO), the controller 51 skips S44 to S49. The printer 10 includes a plurality of timer counters 48. One timer counter 48 counts down with the first timer value as the initial value, and the other timer 48 counter counts down with the second timer value as the initial value.

When the controller 51 of the printer 10 determines that the timer counter 48 has finished the count (S43: YES), the controller 51 generates completion data 2 in the same manner as in S37 (S44). When the controller 51 determines that the cartridge 13 has been replaced (S43: YES), the controller 51 generates completion data 3 in the same manner as described above (S44).

After generating the completion data 2 or the completion data 3 (S44), the controller 51 of the printer 10 generates transmission data that includes the generated completion data 2 or 3 (S45). The transmission data is, for example, a command that includes the completion data 2 or the completion data 3. The command instructs the controller 61 of the information processing device 11 to register the information contained in the completion data 2 or completion data 3 in the database. The controller 51 transmits a request including the generated transmission data to the information processing device 11 indicated by the destination address stored in the memory 53 through the communication I/F 47 and the Internet 12 (S46).

The controller 61 of the information processing device 11 receives the request transmitted by the printer 10 (S46). Then, the controller 61 registers the device information contained in the completion data 2 or the completion data 3 in the database in the same manner as described above (S47). After performing the registration process of S47, the controller 61 generates a response that includes the second timer value. The controller 61 transmits the generated response to the printer 10 through the communication I/F 64 and the Internet 12 (S48).

The controller 51 of the printer 10 receives the response including the second timer value through the communication I/F 47 (S48). Then, the controller 51 starts the countdown of the timer counter 48 using the second timer value included in the received response as the initial value (S49).

Figure 8:
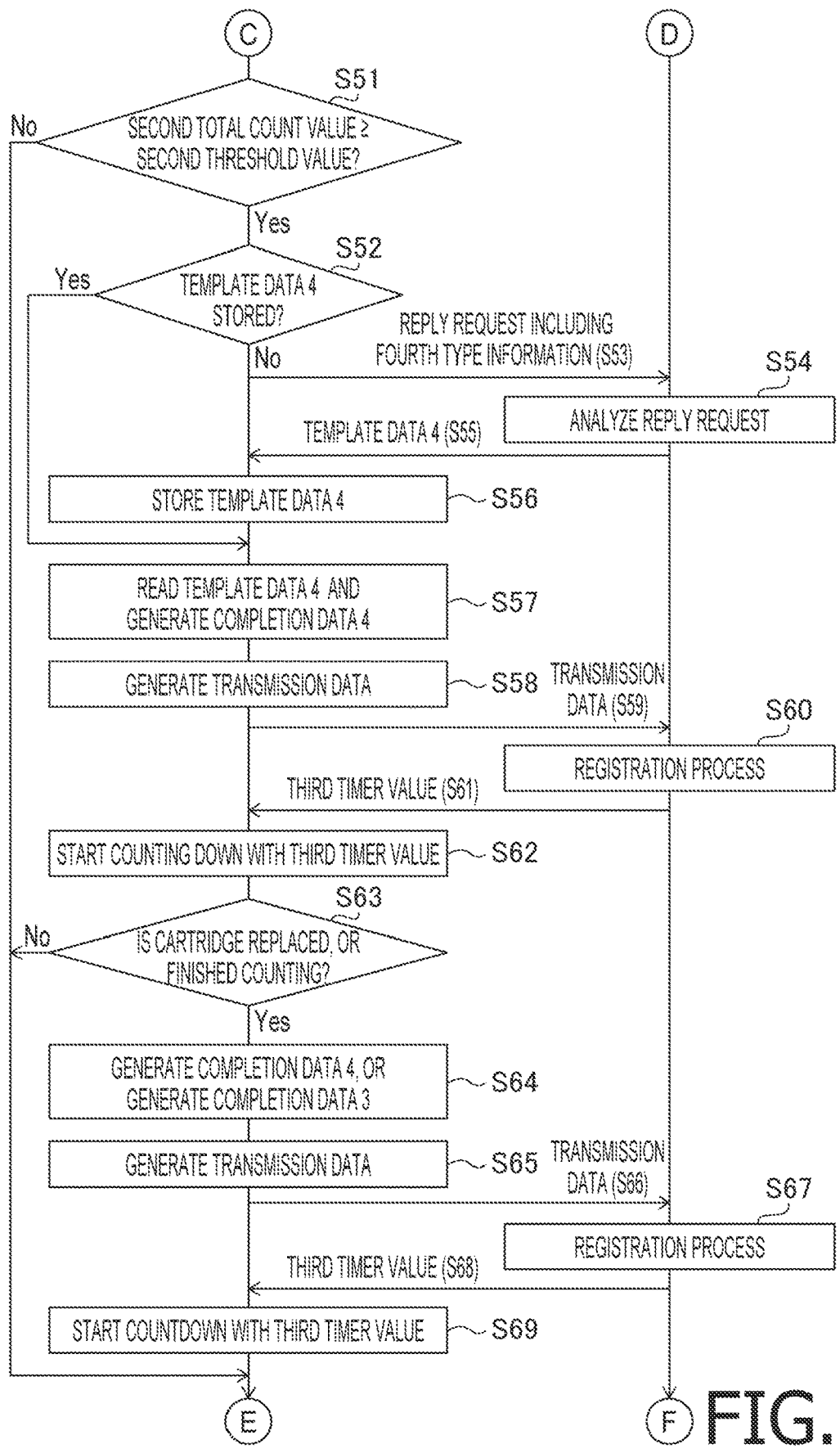

Next, as shown in FIG. 8, the controller 51 of the printer 10 determines whether the second total count value stored in the EEPROM 57 in the above-described counting process (FIG. 10A) is greater than or equal to the second threshold value stored in the EEPROM 57 (S51). That is, in step S51, it is determined whether the ink of which amount is greater than or equal to the amount of the ink indicated by the second threshold value has flowed out of the head 34 after the liquid level of the ink stored in the cartridge 13 mounted on the mounting case 32 becomes lower than the detection position. In other words, in step S51, it is determined whether the ink stored in the cartridge 13 mounted on the mounting case 32 has been used up. In step S51, the controller 51 determines whether the second total count value is greater than or equal to the second threshold value for all cartridges 13 mounted on the mounting case 32. Then, the controller 51 determines that the second total count value is not greater than the second threshold value according to the fact that the second total count value is not greater than the second threshold value for all the cartridges 13. On the other hand, the controller 51 determines that the second total count value is greater than or equal to the second threshold value according to the fact that the second total count value is greater than or equal to the second threshold value even for at least one cartridge 13 out of all cartridges 13 installed in the mounting case 32. The timing at which step S51 is performed is an example of the particular timing.

When the controller 51 of the printer 10 determines that the second total count value is less than the second threshold value (S51: NO), the controller 51 skips steps S52 to S69 described below. On the other hand, when the controller 51 determines that the second total count value is greater than or equal to the second threshold value (S51: YES), the controller 51 determines whether the template data 4 is stored in the EEPROM 57 of the memory 53 (S52). As described above, the template data 4 is template data used to notify the information processing device 11 that the ink stored in the cartridge 13 has been used up.

When the controller 51 of the printer 10 determines that the template data 4 is stored in the EEPROM 57 of the memory 53 (S52: YES), the controller 51 skips steps S53 to S56 of obtaining the template data 4. On the other hand, when the controller 51 determines that the template data 4 is not stored in the EEPROM 57 of the memory 53 (S52: NO), the controller 51 transmits a request including a reply request to the information processing device 11 through the communication I/F 47 and the Internet 12 (S53). Concretely, the controller 51 transmits the request to the destination address stored in the EEPROM 57 of the memory 53. The reply request included in the request contains the fourth type information. The reply request is, for example, a command that includes the fourth type information. The fourth type information is information indicating the template data 4. In other words, in S53, the controller 51 requests the information processing device 11 to transmit the template data 4. The fourth type information is an example of template designation information.

The controller 61 of the information processing device 11 receives the request including the reply request through the communication I/F 64 (S53). The controller 61 analyzes the received reply request (S54). Concretely, the controller 61 determines the type of template data requested by the reply request. The memory 66 of the information processing device 11 stores, in advance, the fourth type information and the template data 4 in an associated manner The controller 61 generates a response including the template data 4 that is associated with the fourth type information included in the reply request. Then, the controller 61 transmits the generated response back to the printer 10 through the communication I/F 64 and the Internet 12 (S55).

The controller 51 of the printer 10 receives the response transmitted by the information processing device 11 through the communication I/F 47 (S55). Then, the controller 51 stores the template data 4 included in the received response in the EEPROM 57 (S56). Then, the controller 51 reads the template data 4 from the EEPROM 57 and generates completion data 4 based on the read template data 4 in the same manner as described above (S57).

After generating the completion data 4 (S57), the controller 51 of the printer 10 generates transmission data that includes the generated completion data 4 (S58). The transmission data is, for example, a command that includes the completion data 4. The command is a command that instructs the controller 61 of the information processing device 11 to register the device information contained in the completion data 4 in the database. The controller 51 transmits a request including the generated transmission data to the information processing device 11 indicated by the destination address stored in the memory 53 through the communication I/F 47 and the Internet 12 (S59).

The controller 61 of the information processing device 11 receives the request transmitted by the printer 10 (S59). Then, the controller 61 registers the device information contained in the completion data 4 in the database in the same manner as described above (S60). After performing the registration process of S60, the controller 61 generates a response that includes a third timer value. The controller 61 transmits the generated response to the printer 10 through the communication I/F 64 and the Internet 12 (S61). The third timer value may be a value indicating the same period of time as the second timer value described above, or a value indicating a different period of time.

The controller 51 of the printer 10 receives the response including the third timer value through the communication I/F 47 (S61). Then, the controller 51 causes the timer counter 48 to start counting down with the third timer value included in the received response as the initial value (S62). The controller 51 determines whether the timer counter 48 that has started counting with the third timer value as the initial value has finished counting the third timer value (S63). The controller 51 also determines whether the cartridge 13 mounted on the mounting case 32 has been replaced (S63). The same procedure as described above is used to determine whether the cartridge 13 has been replaced. When the controller 51 determines that the timer counter 48 has not finished the count and that the cartridge 13 has not been replaced (S63: NO), the controller 51 skips S64 to S69.

When the controller 51 of the printer 10 determines that the timer counter 48 has finished the count (S63: YES), the controller 51 generates completion data 4 in the same manner as in S57 (S64). When the controller 51 determines that the cartridge 13 has been replaced (S63: YES), the controller 51 generates completion template data 3 (S64).

After generating the completion data 4 or completion data 3 (S64), the controller 51 of the printer 10 generates transmission data including the generated completion data 4 or 3 (S65). The transmission data is, for example, a command that includes the completion data 4 or the completion data 3. The command instructs the controller 61 of the information processing device 11 to register the device information contained in the completion data 4 or the completion data 3 in the database. The controller 51 transmits a request including the generated transmission data to the information processing device 11 indicated by the destination address stored in the memory 53 through the communication I/F 47 and the Internet 12 (S66).

The controller 61 of the information processing device 11 receives the request sent by the printer 10 (S66). Then, the controller 61 registers the device information contained in the completion data 4 or the completion data 3 in the database in the same manner as described above (S67). After performing the registration process of S67, the controller 61 generates a response that includes the third timer value. The controller 61 transmits the generated response to the printer 10 through the communication I/F 64 and the Internet 12 (S68).

The controller 51 of the printer 10 receives the response including the third timer value through the communication I/F 47 (S68). Then, the controller 51 starts the countdown of the timer counter 48 with the third timer value included in the received response as the initial value (S69).

Figure 9:
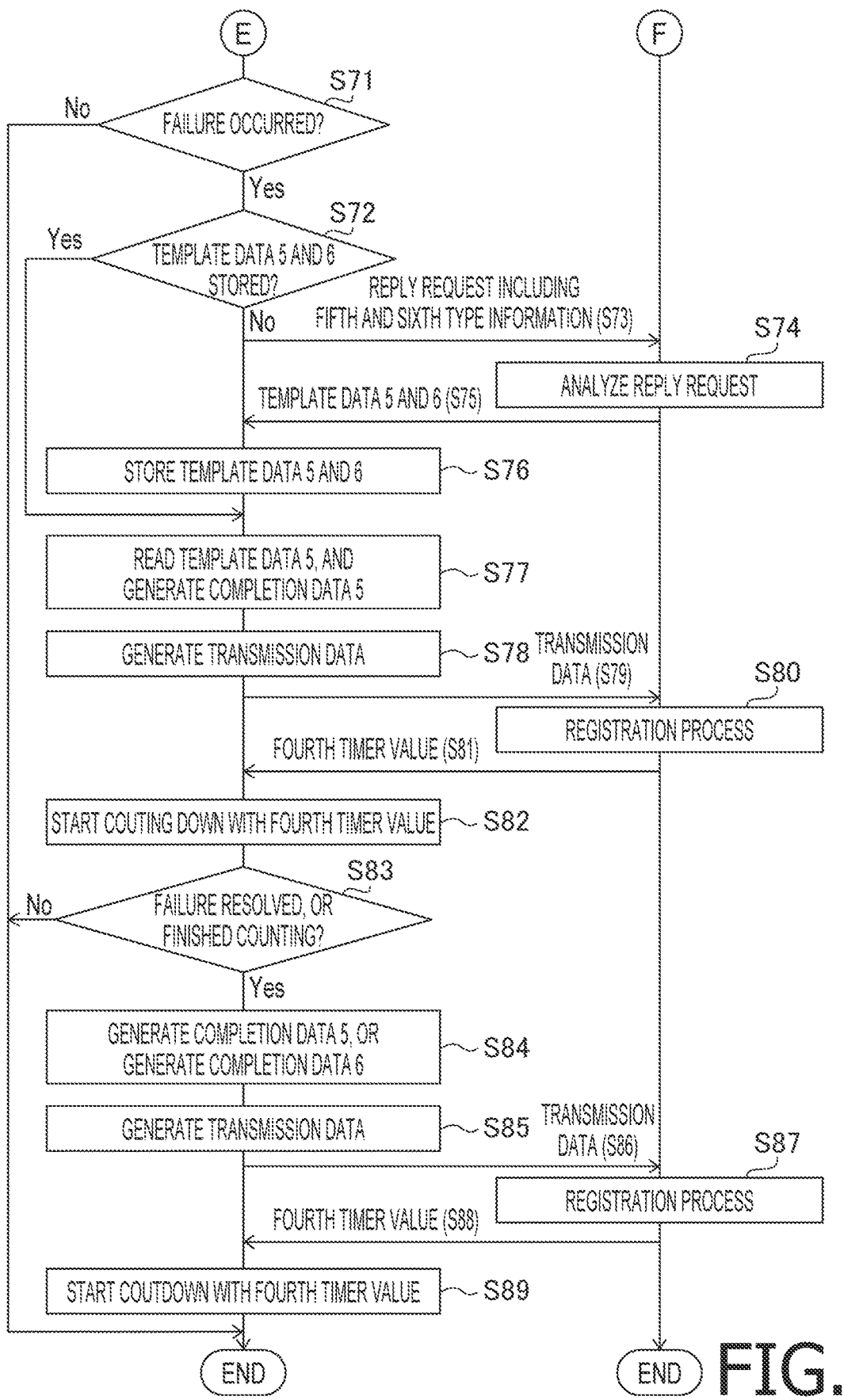

Next, the controller 51 of the printer 10 determines whether a failure has occurred (S71), as shown in FIG. 9. When the controller 51 determines that no failure has occurred (S71: NO), the controller 51 skips steps S72 to S89 and terminates the process. On the other hand, when the controller 51 determines that a failure has occurred (S71: YES), the controller 51 determines whether the template data 5 and the template data 6 are stored in the EEPROM 57 of the memory 53 (S72). As described above, the template data 5 is template data for notifying the information processing device 11 that a failure has occurred. The template data 6 is template data for notifying the information processing device 11 that the failure has been resolved. The timing at which step S71 is performed is an example of a particular timing. The template data 5 is an example of the second template data.

When the controller 51 of the printer 10 determines that the template data 5 and the template data 6 are stored in the EEPROM 57 of the memory 53 (S72: YES), the controller 51 skips steps S73 to S76. On the other hand, when the controller 51 determines that the template data 5 and the template data 6 are not stored in the EEPROM 57 of the memory 53 (S72: NO), the controller 51 transmits a request including a reply request to the information processing device 11 (S73). Concretely, the controller 51 transmits the request to the destination address stored in the EEPROM 57 of the memory 53. The reply request included in the request contains the fifth type information and the sixth type information. The reply request is, for example, a command that includes the fifth type information and the sixth type information. The fifth type information is information indicating the template data 5. The sixth type information indicates the template data 6. In other words, in S73, the controller 51 requests the information processing device 11 to transmit the template data 5 and the template data 6. The fifth type information and the sixth type information are examples of template designation information.

The controller 61 of the information processing device 11 receives the request including the reply request through the communication I/F 64 (S73). The controller 61 analyzes the received reply request (S74). Concretely, the controller 61 determines the type of template data requested by the reply request. The memory 66 of the information processing device 11 stores in advance the fifth type information and the template data 5 in an associated manner, and the sixth type information and the template data 6 in an associated manner The controller 61 generates a response that includes the template data 5 and the template data 6. Then, the controller 61 transmits the generated response to the printer 10 through the communication I/F 64 and the Internet 12 (S75).

The controller 51 of the printer 10 receives the response transmitted by the information processing device 11 through the communication I/F 47 (S75). Then, the controller 51 stores the template data 5 and the template data 6 included in the received response in the EEPROM 57 (S76). Then, the controller 51 reads the template data 5 from the EEPROM 57 and generates completion data 5 based on the read template data 5 in the same manner as described above (S77).

After generating the completion data 5 (S77), the controller 51 of the printer 10 generates transmission data that includes the generated completion data 5 (S78). The transmission data is, for example, a command that includes the completion data 5. The command is a command that instructs the controller 61 of the information processing device 11 to register the device information contained in the completion data 5 in the database. The controller 51 transmits a request including the generated transmission data to the information processing device 11 indicated by the destination address stored in the memory 53 through the communication I/F 47 and the Internet 12 (S79).

The controller 61 of the information processing device 11 receives the request transmitted by the printer 10 (S79). Then, the controller 61 registers the device information contained in the completion data 5 in the database in the same manner as described above (S80). After performing the registration process of S80, the controller 61 generates a response containing a fourth timer value. The controller 61 transmits the generated response to the printer 10 through the communication I/F 64 and the Internet 12 (S81). The fourth timer value is, for example, a value indicating a shorter period of time than that of the first timer value described above. The fourth timer value indicates, for example, a period of time such as 30 minutes, one hour, or three hours. The fourth timer value may be a value that indicates the same period of time as the second or third timer values described above, or it may be a value that indicates a different period of time.

The controller 51 of the printer 10 receives the response including the fourth timer value through the communication I/F 47 (S81). Then, the controller 51 causes the timer counter 48 to start counting down with the fourth timer value included in the received response as the initial value (S82). The controller 51 determines whether the timer counter 48 that has started counting with the fourth timer value as the initial value has finished counting the fourth timer value (S83). The controller 51 also determines whether the failure has been resolved (S83). When the controller 51 determines that the timer counter 48 has not finished the count and the failure has not been resolved (S83: NO), the controller 51 skips steps S84 to S89.

When the controller 51 of the printer 10 determines in S83 that the timer counter 48 has finished the count (S83: YES), the controller 51 generates completion data 5 in the same manner as described above (S84). When the controller 51 determines that the failure has been resolved (S83: YES), the controller 51 generates completion data 6 in the same manner as described above (S84). After generating the completion data 5 or the completion data 6 (S84), the controller 51 generates transmission data including the generated completion data 5 or completion data 6 (S85). The transmission data is, for example, a command that includes the completion data 5 or the completion data 6. The command instructs the controller 61 of the information processing device 11 to register the device information contained in the completion data 5 or the completion data 6 in the database. The controller 51 transmits a request including the generated transmission data to the information processing device 11 indicated by the destination address stored in the memory 53 through the communication I/F 47 and the Internet 12 (S86).

The controller 61 of the information processing device 11 receives the request transmitted by the printer 10 (S86). Then, the controller 61 registers the device information contained in the completion data 5 or the completion data 6 in the database in the same manner as described above (S87). After performing the registration process of S87, the controller 61 generates a response that includes the fourth timer value. The controller 61 transmits the generated response to the printer 10 through the communication I/F 64 and the Internet 12 (S88).

The controller 51 of the printer 10 receives the response including the fourth timer value through the communication I/F 47 (S88). Then, the controller 51 starts the countdown of the timer counter 48 using the fourth timer value included in the received response as the initial value (S89), and terminates the process.

Effects of the Embodiment

The controller 61 of the information processing device 11 transmits, to the printer 10, template data having field names described in a data format that can be processed by the management program 68. Then, the controller 51 of the printer 10 identifies the device information indicated by the replacement data according to the s of the command included in the template data obtained from the information processing device 11, replaces the identified device information with the replacement data, and generates completion data. In other words, the controller 51 of the printer 10 is capable of generating completion data that is described in a data format that can be processed by the management program 68 and that includes the device information required by the management program 68. Accordingly, the printer 10 can cause the information processing device 11 to obtain the device information on consumables and the like without requiring input operations by a worker or the like. As a result, the management program 68 implemented in the information processing device 11 can be made to manage a database in which the device information is registered.

Further, since the controller 51 of the printer 10 generates completion data based on the template data obtained from the information processing device 11, the service provider can freely determine the field names In other words, the printer 10 allows the service provider to freely determine the field names in the database.

The controller 51 of the printer 10 determines whether the template data is stored in the memory 53 (S11 or the like), and when the template data is stored in the memory 53, the controller 51 skips the step of obtaining the template data from the information processing device 11. Thus, the printer 10 can reduce the load of processing of the information processing device 11, as compared with the case where the template data is obtained from the information processing device 11 each time the need to transmit the transmission data to the information processing device 11 arises. In addition, the printer 10 can shorten the time required for generating transmission data.

In addition, the controller 51 of the printer 10 sends a request including the first type information, a request including the second type information and/or the third type information, a request including the fourth type information, a request including the fifth type information and/or the sixth type information to the information processing device 11. Thus, the printer 10 can designate the type of the template data and obtain the template data of the designated type from the information processing device 11.

When the controller 51 of the printer 10 determines that a failure has occurred (S71), the controller 51 obtains the template data 5 and notifies the information processing device 11 that a failure has occurred. In other words, the printer 10 can notify the management program 68 of the information processing device 11 about a failure occurred in the printer 10 in addition to consumable information regarding a consumable.

In addition, the controller 51 of the printer 10 notifies the management program 68 that the amount of the ink stored in the cartridge 13 has become low by transmitting the completion data 2 to the information processing device 11 in response to the second total count value becoming greater than or equal to the first threshold value. As a result, the printer 10 can make the service provider aware that the cartridge 13 needs to be shipped.

In the above-described embodiment, the period indicated by the second timer value that determines the transmission timing for transmitting template data 2 or the template data 3 is shorter than the period indicated by the first timer value that determines the transmission timing for transmitting the template data 1. In other words, when the remaining amount of the ink stored in the cartridge 13 becomes low, the period of time between the transmission of the template data and the transmission of the next template data by the printer 10 becomes shorter. Therefore, the printer 10 can transmit information indicating the remaining amount of the ink and other information in detail (i.e., more frequently) to the information processing device 11 in response to the remaining amount of the ink stored in the cartridge 13 becoming low.

Further, the controller 51 of the printer 10 receives a response including timer values such as the first timer value and/or the second timer value as a response to the request including transmission of template data. Therefore, the printer 10 can reduce the number of times the printer 10 communicates with the information processing device 11, as compared with the case where the printer 10 communicates with the information processing device 11 only to obtain information indicating the transmission timing. As a result, the processing burden of the information processing device 11 can be reduced.

Modifications

The replacement data that the template data shown in FIGS. 4 and 5 have is one of examples. The template data may have different types replacement data in addition to the replacement data shown in the drawings, or may have different types of replacement data in place of the replacement data shown in the drawings.

The field names such as the "Ink Remaining Amount" or "% ink remaining %" that the template data shown in FIGS. 4 and 5 have are examples, and the field names can be described in the expressions designated by the service provider.

In the above-described embodiment, an example is described in which the printer 10 makes a reply request to transmit the template data 1 and a reply request to transmit the template data 2, separately. However, the printer 10 may request all types or multiple types of template data in a single reply request.

In the above-described embodiment, the liquid level sensor 38 that detects the position of the liquid level of the ink stored in the cartridge 13 is described as an example of a sensor. However, the sensor may be any sensor as long as it is capable of detecting a value that varies according to the position of the liquid level of the ink stored in the cartridge 13. For example, instead of the liquid level sensor 38 using the optical path to detect the liquid surface of the cartridge 13, an actuator that moves according to the position of the liquid surface or a prism of which refractive index changes according to the position of the liquid surface may be located.

What is claimed is:

1. An image recording device comprising:
   a cartridge mount configured to hold a cartridge detachably;
   a print engine configured to perform printing;
   a communication interface;
   memory; and
   a controller,
   wherein the controller is configured to:
   transmit a reply request to a destination address of an information processing device through the communication interface, the reply request requesting the information processing device to transmit template data to the image recording device in reply to the reply request, the template data including format data, first replacement data, and second replacement data;
   store the template data obtained through the communication interface in the memory;
   replace the first replacement data of the template data stored in the memory with identification data of the image recording device stored in the memory;
   replace the second replacement data of the template data stored in the memory with detailed information stored in the memory;
   generate transmission data containing the format data, the identification data, and the detailed information; and
   transmit the generated transmission data to the destination address of the information processing device through the communication interface.

2. The image recording device according to claim 1, wherein the controller is further configured to:
   determine whether the template data is stored in the memory, at a particular timing;
   in response to determining that the template data is not stored in the memory, at the particular timing,
      store the template data obtained by transmitting the reply request, in the memory;
      generate the transmission data based on the template data stored in the memory; and
   in response to determining that the template data is stored in the memory, at the particular timing,
      generate the transmission data based on the template data stored in the memory.

3. The image recording device according to claim 1, wherein the template data includes first template data and second template data, a replacement target of the second replacement data contained in the first template data and a replacement target of the second replacement data contained in the second templated data are different, and wherein the controller is configured to transmit the reply request including template designation information designating one of the first template data or the second template data to the destination address through the communication interface.

4. The image recording device according to claim 3,
wherein the detailed information includes consumable information regarding a consumable contained in the cartridge, and failure information regarding a failure having occurred in the image recording device,
wherein the replacement target of the second replacement instruction data contained in the first template data is the consumable information,
wherein the replacement target of the second replacement instruction data contained in the second template data is the failure information, and
wherein the controller is configured to:
  in response to determining that a failure has occurred in the image recording device, store the failure information in the memory;
  in response to storing the failure information in the memory, transmit, to the destination address through the communication interface, the reply request including the template designation information associated with the failure information stored in the memory; and
  obtain the second template data transmitted through the communication interface in reply to the reply request.

5. The image recording device according to claim 3,
wherein the device detailed information includes consumable information regarding a consumable contained in the cartridge, and cartridge replacement information indicating replacement of the cartridge,
wherein the replacement target of the second replacement data contained in the first template data is the consumable information,
wherein the replacement target of the second replacement data contained in the second template data is the consumable information and the cartridge replacement information, and wherein the controller is further configured to:
  determine whether a count value specifying an amount of the consumable contained in the cartridge mounted on the cartridge mount has reached a threshold value;
  in response to determining that the count value has reached the threshold value, transmit the reply request requesting transmission of the second template data to the destination address through the communication interface; and
  obtain, through the communication interface, the second template data transmitted in reply to the reply request.

6. The image recording device according to claim 5,
wherein the controller is configured to:
  obtain first timing information from the information processing device through the communication interface, the first timing information indicating a first transmission timing at which the transmission data generated based on the first templated data is to be transmitted; and
  obtain second timing information from the information processing device through the communication interface, the second timing information indicating a second transmission timing at which the transmission data generated based on the second templated data is to be transmitted,
wherein the first transmission timing indicates a first period from when the controller obtained the first timing information to when the transmission data is to be transmitted,
wherein the second transmission timing indicates a second period from when the controller obtained the second timing information to when the transmission data is to be transmitted, and
wherein the second period is shorter than the first period.

7. The image recording device according to claim 1,
wherein the controller is configured to obtain, through the communication interface, timing information transmitted in replay to one of the reply request or the transmission data, the timing information indicating a timing at which the transmission data is to be transmitted.

* * * * *